Oct. 24, 1939.  C. SMITH  2,176,932
ELECTRICAL CALCULATING MACHINE
Original Filed May 31, 1932   12 Sheets-Sheet 2

INVENTOR.
Clyde Smith

Oct. 24, 1939. C. SMITH 2,176,932
ELECTRICAL CALCULATING MACHINE
Original Filed May 31, 1932 12 Sheets-Sheet 3

INVENTOR
Clyde Smith

Oct. 24, 1939.  C. SMITH  2,176,932
ELECTRICAL CALCULATING MACHINE
Original Filed May 31, 1932   12 Sheets-Sheet 4

INVENTOR.
Clyde Smith

Oct. 24, 1939.   C. SMITH   2,176,932
ELECTRICAL CALCULATING MACHINE
Original Filed May 31, 1932   12 Sheets-Sheet 5

INVENTOR
Clyde Smith

Inventor:
Clyde Smith.
By: Belt & Wallace
Attorneys

Oct. 24, 1939.  C. SMITH  2,176,932
ELECTRICAL CALCULATING MACHINE
Original Filed May 31, 1932   12 Sheets-Sheet 10

Inventor:
Clyde Smith,
By: Belt & Wallace
Attorneys

Patented Oct. 24, 1939

2,176,932

UNITED STATES PATENT OFFICE 2,176,932

ELECTRICAL CALCULATING MACHINE

Clyde Smith, Hopkinsville, Ky., assignor to Addressograph-Multigraph Corporation, Cleveland, Ohio, a corporation of Delaware Application May 31, 1932, Serial No. 614,411
Renewed June 19, 1939

9 Claims. (Cl. 235—61)

My invention relates to a complete calculating machine, electrically selective and operative in its computations as well as in its drive. The objects are to effect additions and multiplications by direct key or other settings and automatic action.

The apparatus for adding consists essentially of a series of relays, numerically arranged in pairs for each of the digits, 1, 2, 3 . . . . 9, in each of the desired orders, units, tens, hundreds, etc. The energization of a pair of relays of a given numerical value (corresponding to a key setting) locks that pair and the others of less value in the series down to the first. From these relays, through a control relay for each order of numbers, circuits extend to a register system. This includes a number wheel for each order, each wheel being engageable with a driving shaft by a magnetic clutch. After any relay in a given order is energized, an associated number wheel clutch is energized. As the wheel for any order of numbers advances one digit place through the driving of the shaft and the holding of the clutch, it closes and opens a contact that operates to release certain of the energized relays; and thus successively in its advance it releases each locked relay down to the lowest, until with the control relay release the clutch is released and the number wheel stops, having advanced as many numbers as the numerical value of the relay which was locked at the outset.

For multiplication, a similar system of locking and release of paired relays is provided, the relays employed in adding being utilized for multiplicand and another system of relays being provided for the multiplier. The effect of relay locking in the multiplying series is to cause the adding process to repeat so long as any of the relays in the multiplier series remains unreleased through the successive repetitions which release one pair of multiplier relays for each round of registration.

As multiplication proceeds from a lower to a higher order of digits in the multiplier, the lower order of number wheel is automatically released and the multiplying process switched to the higher orders of wheels remaining, the effect being the same as the movement of the carriage to a higher order of position in the ordinary multiplying machine. To make this switching automatic and immediate upon the completion of multiplication by a given digit-multiplier is one of the objects of the invention.

Associated with the number wheels is a system of carry-over relays in which the carry-over record is stored and by which the carry-over cumulation is applied to the different number wheels in succession immediately after the completion of their original movements.

It may be observed that in the ordinary hand-operated adding machine a full stroke of the lever is required for the least addition, and in the hand-operated multiplying machine a full turn of the crank for the least multiplication; and that like full movements are performed in such machines electrically operated; that is, electrically operated means is provided for actuating parts corresponding to the lever or crank. In the machine herein described, the number wheels are directly connectable with and for movement by constantly rotatable parts thus diminishing the time required for moving such wheels to the desired positions.

A selected embodiment of my invention is illustrated in the accompanying drawings wherein, Figure 1 shows the keys which are depressed and locked down for amounts to be added or for a multiplicand.

Figure 2 shows keys to be operated for a multiplier, and also control keys for starting, zero-setting, error correction, and repeating, and associated relays.

Figure 3 includes the counting and multiplier relays.

Fig. 4A is a partially schematic view showing a shunting wheel with its associated shunting contact and a portion of an electric circuit controlled by said contact.

DESCRIPTION OF THE APPARATUS

The function of the various elements and circuits in which they are included are first described. Subsequently the operation of these elements and circuits is described in connection with the performance of illustrative computations.

Figure 1:
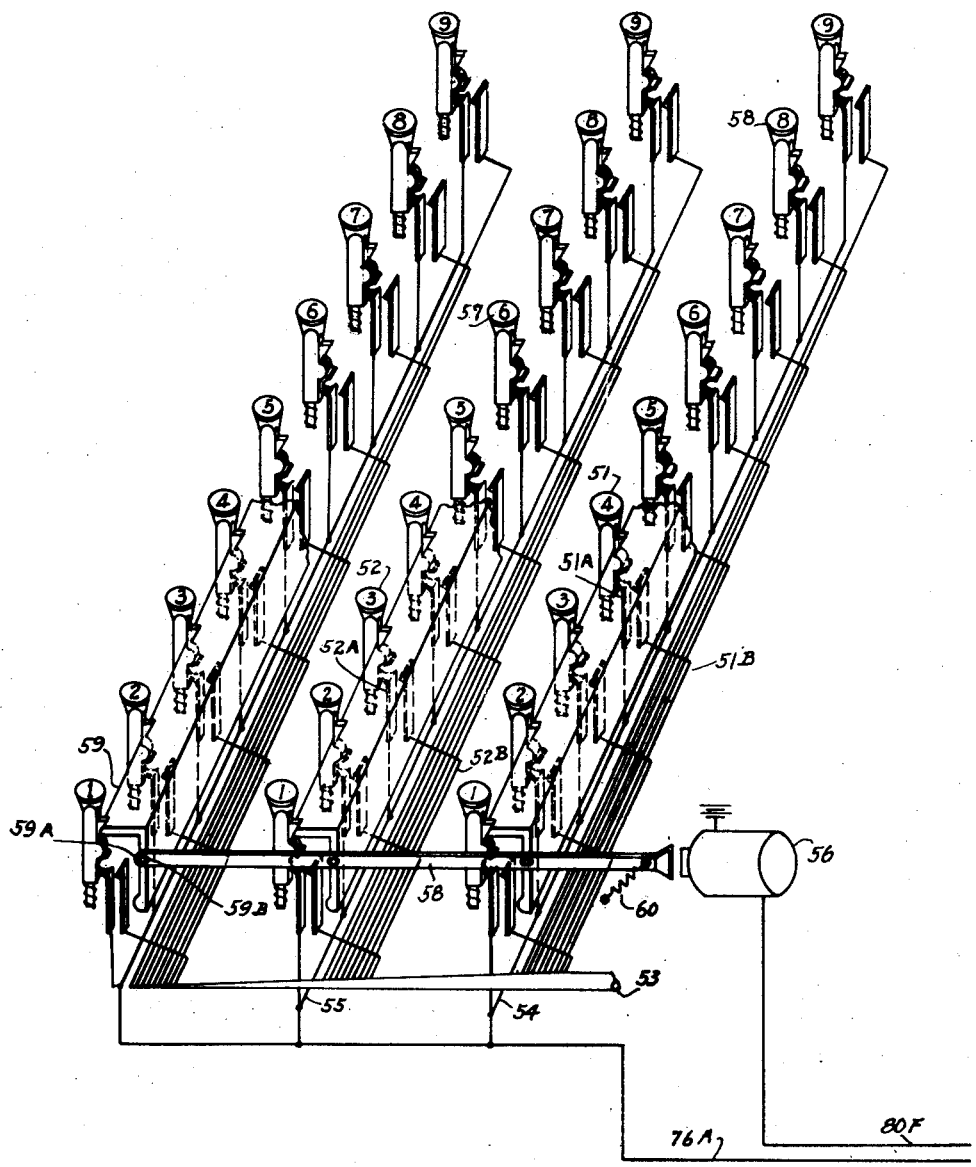

Multiplicand keys. Fig. 1

In Fig. 1, three rows of keys numbered 1 to 9 in each row are shown which are selectively pressed to set up successive numbers in addition or subtraction or to set up a multiplicand in multiplication. These keys selectively prepare for energization of the counting or multiplicand relays shown in the upper part of Fig. 3.

The keys shown in Fig. 1 are conventional lock down contact-closing keys. Releasing means common to all of these keys are provided for releasing locked down keys at the end of a computation. The locking and releasing means includes a locking bar as 59 for each row of keys. These bars are operative to retain a depressed key in any row in locked down position. The several bars are connected to the release bar 58 by pins as 59A through slots as 59B. The bar 58 is normally held in position to retain the bars as 59 in locking position by a spring 60 and is moved to effect release of locked down keys by energization of the magnet 56. Once depressed a key stays in its locked down position until released by the energization of the magnet 56 or the depression of another key in the same row.

Each key operates a pair of contacts, one of which is 52A. One side of each pair of contacts associated with each key in each row is connected to a common conductor, as 55, and these common conductors for each row are connected to a grounding conductor 76A which leads to one side of a contact associated with the starting key 76 (Fig. 2), the other side of which contact is grounded whereby when the non-locking key 76 is depressed the sides of the contacts connected to the common conductors, as 55, are grounded.

Figure 3:
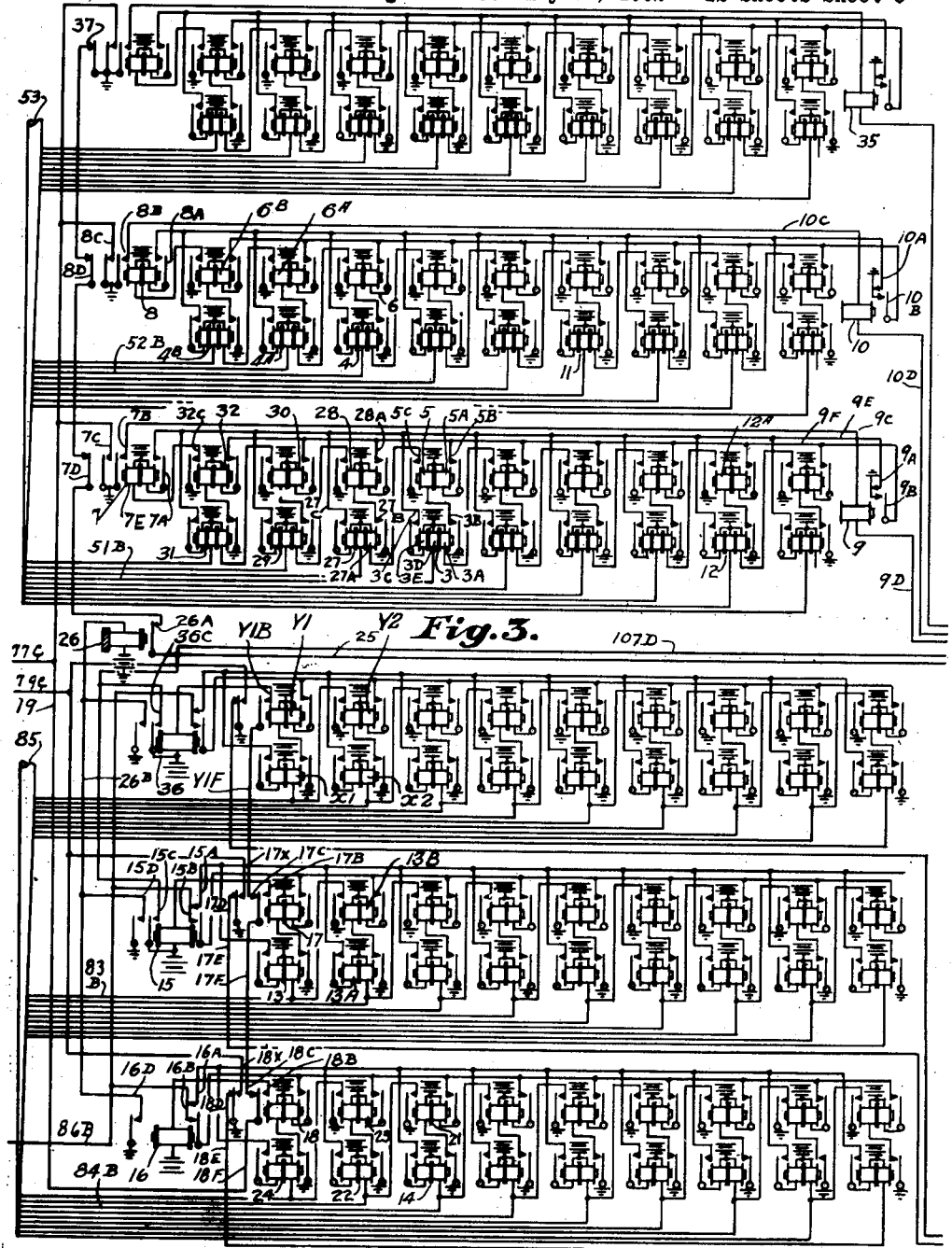

The other side of each contact associated with each key shown in Fig. 1, as for example the mate to contact 52A, is respectively connected to a conductor as 52B, and these conductors, leading from said other side of like contacts, are wired in a cable 53 which, in the drawings, terminates in Fig. 1 and reappears in Fig. 3.

Figure 2:
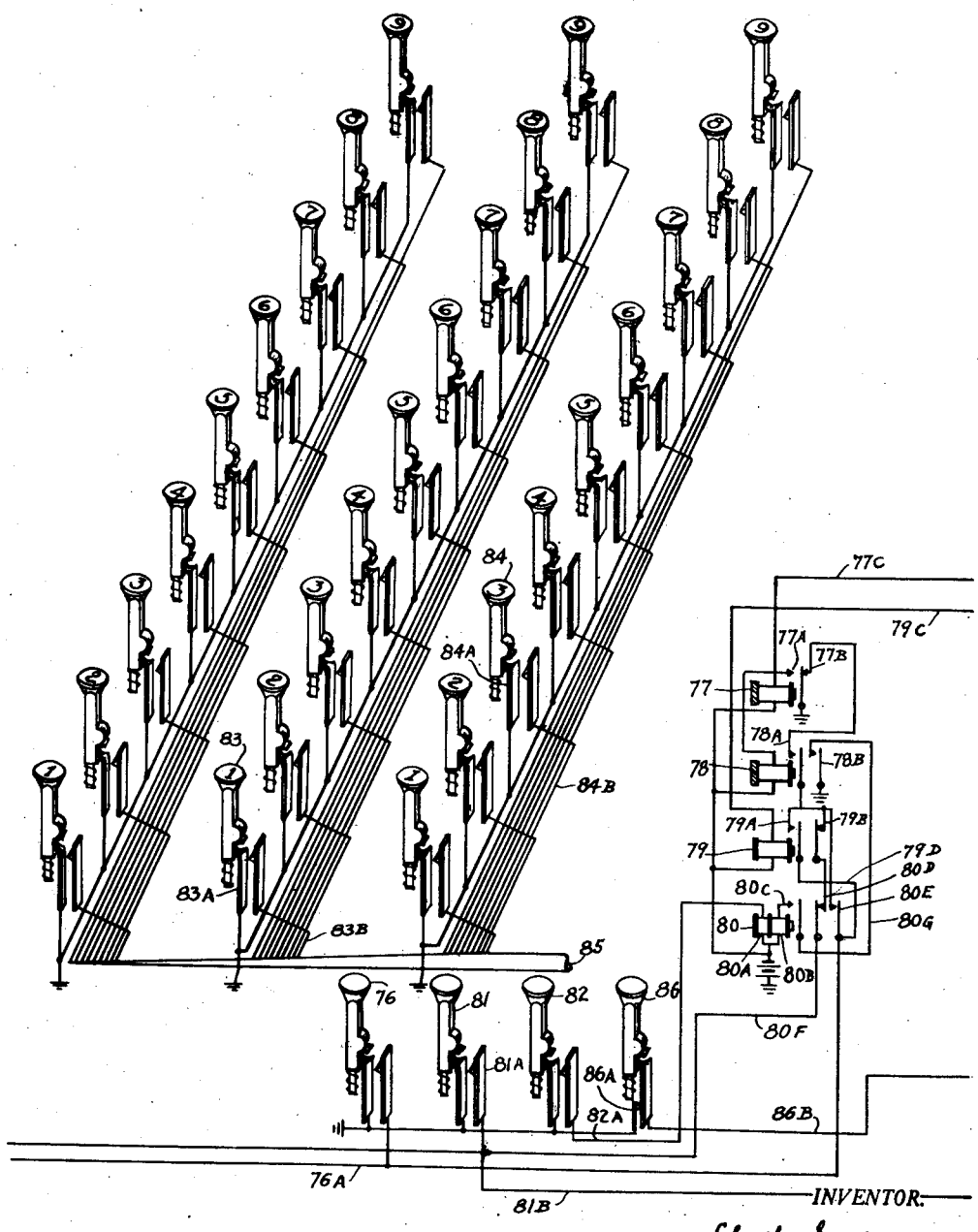

*Multiplier and control keys. Fig. 2*

The bank of keys shown in Fig. 2 are for the purpose of setting up a multiplier and are referred to hereinafter as the multiplier keys. They are arranged in three rows and are numbered 1 to 9 in each row. When pressed these keys effect energization of the multiplier relays shown in the lower part of Fig. 3. These keys are of a conventional non-locking contact-closing type. One side of each pair of contacts of each key is grounded, the other side is wired to conductors as 84B which lead into a cable 85 terminated in Fig. 2 and reappearing in Fig. 3.

The control key 76 is the starting key for the purpose of setting the machine in operation by energizing the counting relays through circuits prepared by the closed contacts of the operated keys shown in Fig. 1.

Control keys 81, 82 and 86 are of a conventional two contact type and one contact associated with each key is wired to ground. Keys 81 and 82 have normally open contacts; key 86 has normally closed contacts. Contact 81A of key 81 is connected through conductor 81B to devices for effecting a zero-setting operation in the amount manifesting device or registers shown in Fig. 4. Contact 86A of key 86 is connected through conductor 86B with devices for grounding those multiplier relays in Fig. 3 that are to be locked up. When it is desired to correct an error arising from the pressing of one or more incorrect multiplier keys, key 86 is pressed whereby contact 86A is opened and any locked up multiplier relays are released, as explained more fully hereinafter. One side of the normally open contact associated with key 82 is connected through conductor 82A with one winding of relay 80 which is to be energized and locked up when a repeat operation is to be formed in addition. Relay 80 locks up through a local circuit when key 82 is pressed, said key being pressed to effect a repeat operation only after the starting key 76 has been pressed to start the machine in operation, pressing of key 76 indirectly effecting energization of relays 77 and 78, it being necessary that relay 78 be energized in order to establish the holding circuit for relay 80.

Thus key 81 is a zero-setting key, key 82 is a repeat key for use in an adding operation, and key 86 is an error correcting key.

*Key release, multiplicand and repeat addition relays. Fig. 2*

Relays 77 and 78 are slow-to-release relays. In their cycle of operation they effect momentary energization of the release magnet 56 (Fig. 1) or they effect grounding of depressed multiplicand keys of Fig. 1 in a multiplying operation or they effect grounding of depressed keys of Fig. 1 in a repeat addition operation, as will be explained in connection with the descriptions of these operations hereinafter.

Relay 77 is energized by the closing of contacts, as 7C (Fig. 3), on all energization of the counting relays (Fig. 3) effected in a manner described presently. When energized relay 77 opens contact 77B and closes contact 77A whereupon ground is applied to relay 78 which then energizes and closes contact 78A. Contact 78A prepares a circuit to contacts 79A or 79B and to 80E or 80D depending upon the operation to be performed; if multiplication, relay 79 is deenergized as at the end of a multiplying operation, and circuits are set up through contacts 77B, 78A, 79A, conductors 79D, and 76A, through the operated keys of Fig. 1. In an operation when no multiplication is performed, as addition, a circuit is prepared upon the closing of contact 78A through contact 79B to contact 80D and through conductor 80F to magnet 56. When relay 77 is deenergized and released by the opening of contacts as 7C at the end of an entry operation that is under control of the counting relays shown in the upper part of Fig. 3, the contact 77B closes and grounds, wherefore release magnet 56 is energized through the circuit including contacts 78A, 79B, and 80D. The deenergization and subsequent release of slow-to-release relay 77 also opens contact 77A which deenergizes relay 78 and when this slow-to-release relay subsequently releases contact 78A is opened whereupon circuit to magnet 56 is broken and thereupon this magnet releases. Thus magnet 56 is only energized long enough to effect retraction of locking bars as 59 so as to release any locked down keys in Fig. 1.

If either relay 79 or relay 80 is energized at the time relay 77 is released as just described, circuit to release magnet 56 is opened either at contact 79B or 80D depending upon which of these two relays is energized. Furthermore, the energization of either relay 79 or relay 80 switches the circuit from contact 77B to conductor 76A so as to ground this conductor with the same effect as the pressing of key 76. This is to be done, however, only when multiplication is to be effected or when a repeat operation in addition is to be effected.

Thus, relay 79 is for the purpose of shifting the circuit prepared from contact 77B from the release magnet 56 to grounding conductor 76A in a multiplying operation. Relay 79 is energized through conductor 79C and contacts as 18X (Fig. 3) of the multiplier relays, which such contacts are closed upon energization of any multiplier relays. Contacts as 18X remain closed until during the last operation of a multiplying operation. When energized relay 79 closes contact 79A and opens contact 79B. The opening of contact 79B breaks the circuit to the release magnet 56. The closing of contact 79A prepares a circuit for momentarily grounding contacts associated with locked down keys in Fig. 1 in each round of multiplication. However, relay 79 releases during the last operation of a multiplying operation whereupon contact 79A is opened and contact 79B is closed so that the release magnet 56 will be energized upon completion of the multiplying operation whereby locked down keys in Fig. 1 will be released at the end of such an operation.

Relay 80 is energized by the closing of the contact associated with key 82 to effect a repeat operation in addition. As stated heretofore, key 82 is not pressed until after starting key 76 has been pressed and more accurately not until after an entry operation under control of the counting relays has been started which such starting will be indicated to the operator by movement of the number wheels of Fig. 4. By the time the wheels shown in Fig. 4 take motion relay 77 as well as relay 78 will be energized. The energization of relay 78 closes contact 78B which prepares a circuit to contact 80C. The pressing of key 82 after the circuit to contact 80C has been prepared results in the energization of relay 80 which closes contact 80C whereby a stick circuit for relay 80 is provided from contact 78B. When relay 80 is deenergized contact 80D is closed and circuit is established therethrough as heretofore described to release magnet 56. When, however, relay 80 is energized, contact 80D is opened and contact 80E is closed which prepares a circuit from contact 77B to conductor 76A so that when relay 77 releases at the end of a first entry operation and contact 77B closes, conductor 76A is grounded which effects reenergization of counting relays respectively connected with locked down keys in Fig. 1. Such release of relay 77, however, results in the release of relay 78 which opens contact 78B but this occurs subsequent to the closing of contact 77B so that relay 80 remains energized until after conductor 76A has been grounded with the effect just described. But following the grounding of conductor 76A from contact 77B that is occasioned by the release of relay 77, slow-to-release relay 78 releases by reason of the opening of contact 77A. Such subsequent release of relay 78 opens contact 78B which breaks the stick circuit for relay 80 so that 80E opens and contact 80D closes wherefore when relay 77 releases at the end of the newly initiated entry operation and contact 77B closes, circuit to conductor 76A will be opened at contact 80E but circuit to release magnet 56 will be closed at contact 80D so that this closing of contact 77B effects energization of release magnet 56 which results in the release of locked down keys in Fig. 1.

Counting or multiplicand and multiplier Relays. Fig. 3

Figure 4:
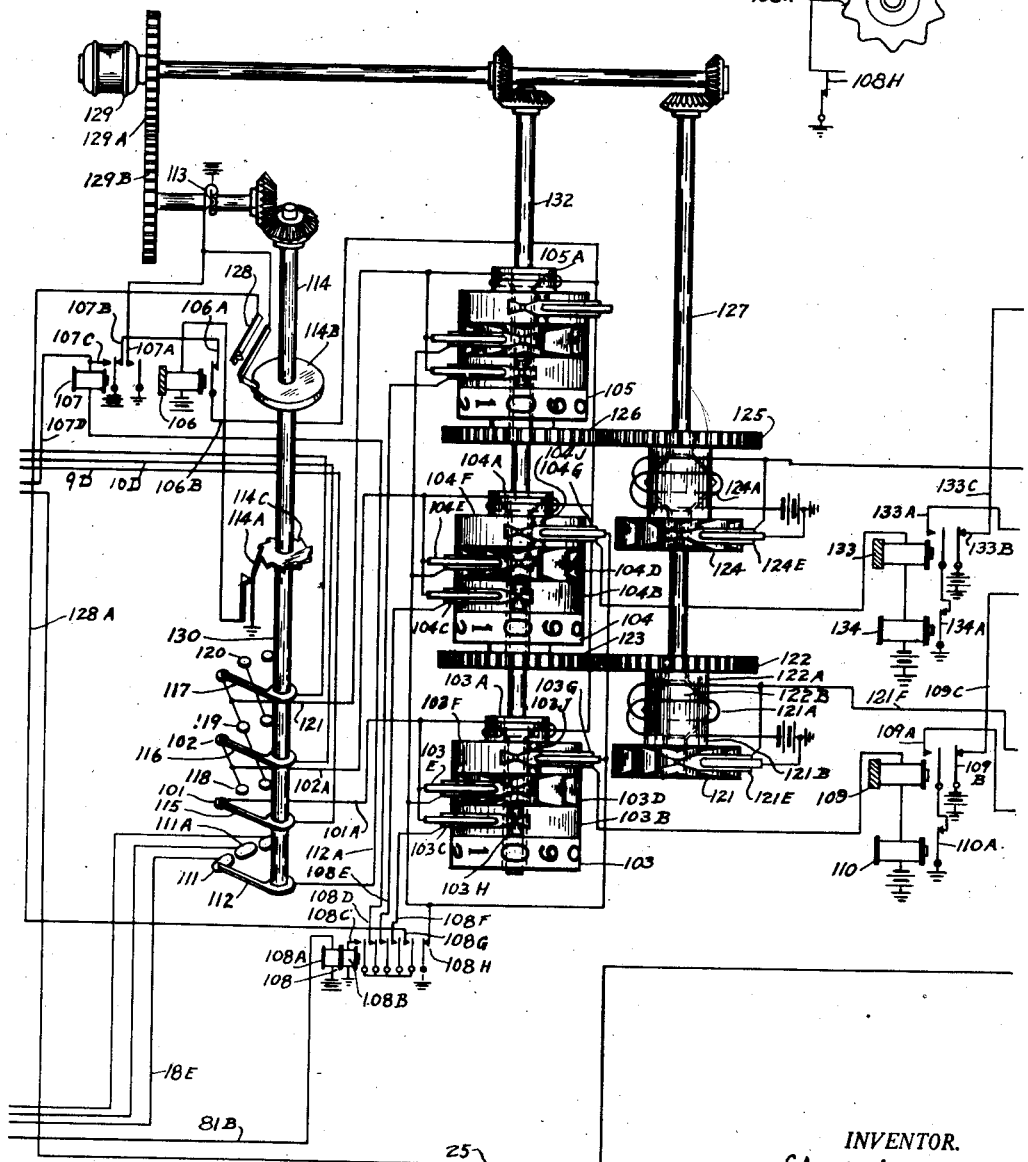
Figure 4 shows the number wheels and order switching mechanism.

Two sets of relays are shown in Fig. 3; the upper set consisting of the upper three groups are the counting or multiplicand relays. They take up the setting of the keys of Fig. 1 and, in a manner to be explained, effect registration of this setting in the amount manifesting device (Fig. 4). The lower three groups are the multiplier relays. They are set up by the multiplier keys of Fig. 2 and effect repeated grounding of contacts associated with depressed keys of Fig. 1 to thereby repeatedly energize multiplicand relays for repeated registrations in multiplying operations, as will later be described. Three groups of counting or multiplicand relays and three groups of multiplier relays are illustrated, the lowermost group in each class representing the units order, the middle group the tens order and the uppermost group the hundreds order. The relays in each group are arranged in a chain of two rows. The relays in the rows are paired whereby nine pairs of relays respectively for the digits 1 to 9 are provided. Each group of counting relays also includes a cut-off and a stepping relay.

Each relay in the lower row of the three groups of counting relays as 3, 27, 29 and 31 has three windings as 3A, 3D and 3E. A conductor leads from the middle winding of each of these relays to a contact associated with a like positioned key in Fig. 1. For example, a conductor 51B leads from the middle winding, 3D, of the relay 3 for the digit 4 of the units order of counting relays to the contact 51A associated with the key 51 (Fig. 1) for the digit 4 in the units order row of keys in Fig. 1. When the key 51 is depressed, the contact associated therewith is closed and the winding 3D is prepared for energization. This energization is momentary and is effected either by pressing key 76 or closing of contact 77B when contacts 78A and 79A or 80E are closed. Relay 3 once energized locks up through winding 3E, contact 3C, conductor 9E and contact 9A of stepping relay 9 so long as contact 9A is closed, that is to say, so long as stepping relay 9 is deenergized, but this relay, that is, the first in the chain to energize, is the first to be released upon the energization of relay 9. Other relays in the lower rows of the three groups of counting relays are similarly prepared for energization by the depression of the correspondingly positioned keys in Fig. 1 and are locked up by depression of starting key 76 or grounding of conductor 76A from contact 77B as above described.

When a relay in the lowermost row of the three groups of counting relays is energized and locked up, its mate positioned immediately thereabove, and the pairs of counting relays in the same group of less numerical value are also energized and locked up. Thus when relay 3 for the digit 4 in the units order is energized and locked up its mate 5 is energized through contact 3B which is closed when relay 3 energizes. Energization of relay 5 closes contact 5C which energizes relay 27 through winding 27A. This closes contact 27B whereby relay 28 is energized and in like manner the remaining relays in this group of counting relays and of less numerical value than the first energized relay in the group are energized and locked up.

Energization of relays in the upper rows of counting relays, as relays 5 and 28, closes contacts as 5B thereof. This prepares a circuit through conductor 9F to contact 9B of stepping relay 9 and hence when relay 9 energizes to open contact 9A, contact 9B closes before 9A opens and holds relay 5 energized until relay 9 again deenergizes.

The cut-off relay 7 is in addition to the pairs of counting relays. The relay 7 energizes when the upper relay 32 for the digit 1 in the units order of counting relays is energized, energization of relay 32 closing contact 32C whereby relay 7 is energized through its winding 7E. Energization of relay 7 closes contact 7A to afford a stick or holding circuit through conductor 9E and contact 9A whenever relay 9 is deenergized.

Energization of relay 7 also closes contact 7C whereby through conductor 77C, relay 77 is energized; the closing of this contact also energizes through conductor 19, relay 16 or like relays as 15 and 36 when relays as 18 have been energized to close contacts as 18B which condition prevails when a multiplying operation is to be performed.

Energization of relay 7 also closes contact 7B, after the closing of contact 7C, whereby a circuit is closed through conductor 9C, relay 9, conductor 9D to the clutch 103A of the wheel unit of the manifesting device that includes the number wheel 103, this being the wheel unit for the units order. The operation of this circuit will be explained more fully hereinafter. Such closing of contact 7B energizes relay 9 whereby contact 9B is closed and contact 9A is opened with a make-before-break effect for a purpose explained more fully hereinafter.

Relay 7 deenergizes during the entry of the last digit on the number wheel 103, as will be explained more fully hereinafter, with the effect of stopping this number wheel when the entry of the digit has been completed, this being effected by opening of contact 7B upon deenergization of relay 7. Contact 7C also opens upon deenergization of relay 7 to deenergize relays such as 16 and relay 77.

Relay 7 also includes a contact 7D which is in circuit with the contact 26A of slow-to-release relay 26 and contact 7D closes upon release of relay 7, whereby if similar contacts of the other cut-off relays are closed and the slow-to-release relay 26 is released, circuit is closed through the contact 26A to effect a carry-over operation explained more fully hereinafter. Relay 7 is the last in a chain of counting relays to release and therefore contact 7D does not close until all of the counting relays in the chain have been released and consequently a carry-over operation cannot be effected until all of the counting relays have been released.

Relay 7 is energized initially through contact 32C of the upper relay of the No. 1 pair of counting relays and is held energized through this contact as long as this relay is energized, but upon deenergization of relay 32 control of relay 7 passes to contact 9A through contact 7A.

The cut-off relay 7 for the units order of the counting relays has been described in detail and it is to be understood that similar cut-off relays are associated with the counting relays for the tens and hundreds order and that these cut-off relays control energization and deenergization of the clutches of the number wheel units for the tens and hundreds orders. If counting relays for additional orders were provided as for thousands, etc., similar cut-off relays for the counting relays for these orders would be provided.

A stepping relay is associated with the counting relays for each order as 35 for the hundreds order, 10 for the tens order and 9 for the units order. These relays are for the purpose of releasing counting relays in each digit advance of the number wheel of the connected number wheel unit. They are energized through a contact as 7B on the associated cut-off relays as 7 as before described and are deenergized and reenergized by the movement of a shunting wheel as 103D of the number wheel unit for the particular order as the number wheel of the unit moves from digit to digit. Shunting wheels as 103D close and open shunting contacts as 103E during each digit advance of the associated number wheel. The manner in which the shunting wheels as 103D are adapted to close their associated shunting contacts is illustrated in Fig. 4A. The digital positions of the number wheels respectively associated with the shunting wheels are so correlated therewith that when a number wheel stands centered upon a digital entry, the shunting wheel will stand in the position for receiving the rider as 103X in a depression between two adjacent shunting-wheel lobes whereby the contact as 103E is opened as shown in Fig. 4A. As a number wheel rotates from digital position to digital position a lobe of the associated shunting wheel as 103D will pass under the rider as 103X each time the number wheel moves from one digital position to the next, the contact as 103E being thus closed shortly after the number wheel is moved from a digital position and is permitted to open shortly prior to the number wheel reaching the succeeding digital position toward which it is being moved.

Referring particularly to the stepping relay 9 which is typical of all the stepping relays, it is provided with, as before indicated, make-before-break contacts 9A and 9B. Referring also to the heretofore described energization of relay 3 and associated relays of lower value, the first energization of relay 9 by the closing of contact 7B closes contact 9B and opens contact 9A. Opening of contact 9A frees conductor 9E from ground whereupon relay 3 is released through contact 3C.

Contact 9B grounded conductor 9F before ground was removed from conductor 9E. As explained, contact 5B of relay 5 is connected to conductor 9F and prepares a stick or holding circuit through winding 5A of relay 5. Hence when conductor 9F is grounded relay 5 is held energized through contact 9B notwithstanding the deenergization of relay 3 and opening of contact 3B.

During the entry of the first digit on the number wheel 103 the shunting wheel 103D closes contact 103E whereby conductor 9D is grounded between relay 9 and the source of battery for this relay. Such source of battery is at the left-hand armature of relay 107 of Fig. 4, and so long as relay 107 is unenergized the circuit from this battery is traceable through contact 107B of relay 107, contact 106A of relay 106, conductor 106B, clutch 103A, conductor 101A, contact 101, switch arm 115, conductor 9D, stepping relay 9 of Fig. 3, conductor 9C and through contact 7B of cut-off relay 7 to ground. The closing of shunting contact 103E by one of the lobes on shunting wheel 103D extends ground at contact 108H of unenergized relay 108, and through such closed shunting contact to conductor 191A thereby simply supplementing the ground at contact 7B of cut-off relay 7 so far as concerns energization of the clutch 103A so this clutch remains energized causing continued rotation of the number wheel 103 and its associated parts including the shunting wheel 103D. Such application of ground through shunting contact 103E to conductor 101A does, however, effect the shunting out of stepping relay 9 since this relay will then be impressed with ground potential upon both sides. Thus the closing of shunting contact 103E shunts out and causes deenergization of stepping relay 9 which then closes contact 9A before opening contact 9B. Closing of contact 9A causes relay 27 to be held energized through its left hand winding as viewed in Fig. 3 and its contact 27C which is connected to conductor 9E that is grounded when contact 9A closes. Thus when contact 9B opens upon deenergization of relay 9 and conductor 9F is freed from ground and relay 5 deenergizes, relay 27 remains energized through its contact 27C.

Prior to the time the first digit is entered on the number wheel 103, shunting wheel 103D opens contact 103E freeing conductor 9D from ground between the relay 9 and its source of battery whereupon relay 9 reenergizes closing contact 9B and opening contact 9A whereby relay 27 is released, but its mate relay 28 remains energized through contact 9B in the same way as relay 5 remained energized subsequent to the release of relay 3. Relay 28 remains energized until conductor 9D is again grounded between relay 9 and its source of battery at a time during the entry of the second digit on the number wheel 103 corresponding to the time during the entry of the first digit when shunting wheel 103D closed contact 103E grounding conductor 9D. This grounding of conductor 9D during the entry of the second digit has the effect of releasing relay 28 and holding relay 29 in the same manner as that in which the prior deenergization of relay 9 released relay 5 and held relay 27. Prior to the time the entry of the second digit on the number wheel 103 is completed the shunting wheel 103D opens contact 103E whereby relay 9 energizes and opens contact 9A and closes contact 9B whereupon relay 29 is released but relay 30 is held.

The foregoing operation continues releasing the counting relays in the manner described until during the entry of the last or fourth digit on the number wheel 103 when the shunting wheel 103D closes the contact 103E with the effect of releasing relay 32. This, however, does not release the cut-off relay 7 which is held through the closed contact 9A. However, just prior to the time the entry of the last digit on the number wheel 103 is completed the shunting wheel 103D opens contact 103E freeing conductor 9D from ground between relay 9 and its source of battery whereupon relay 9 reenergizes. This opens contact 9A whereupon relay 7 releases and then relay 9 and clutch 103A release because of relay 7 opens contact 7B which is the source of ground for relay 9 and clutch 103A. This releasing of the clutch occurs at the time the entry of the last digit on the number wheel 103 is completed.

In the manner above described the counting relays for the tens and hundreds and additional orders cause digits to be entered on the number wheel for these orders.

Thus since pairs of counting or multiplicand relays corresponding in number to the number to be entered in a particular order are locked up and as these relays are successively released in declining sequence as the digits are entered on the number wheel for the order in ascending sequence, and as the release of the upper relay of the last or lowermost pair of counting or multiplicand relays is followed by the release of the cut-off relay for the order during the entry of the last digit and as this is immediately followed by the release of the clutch of the number wheel for the particular order, which occurs when the last digit is fully entered on the number wheel, a digit corresponding to the number of locked up pairs of counting or multiplicand relays in a particular order is entered on the number wheel for the order.

The multiplier relays are arranged and act in the same manner as the counting relays except that they are not provided with cut-off relays and the relays 16, 15 and 36 at the left hand end of the chains thereof serve as stepping relays. Furthermore, the upper relay of the No. 1 pair of relays for each order, as 17, is provided with special contacts as 17B, 17X and 17D and all multiplier relays have but two windings.

The multiplier relays are energized by momentarily closing the contacts associated with the multiplier keys shown in Fig. 2 which is effected by momentarily depressing one of the keys. There is a key for each pair of multiplier relays and, as with the keys of Figs. 1 and the counting relays, the contact associated with each multiplier key in Fig. 2 is respectively connected to a correspondingly positioned relay in the groups of multiplier relays of Fig. 3.

One side of the contact 84A associated with the key 84 has a wire 84B connected thereto and the wire 84B and similar wires from the contacts associated with the contacts of the other multiplier keys are wound in a cable 85 which terminates in Fig. 2 but reappears in Fig. 3. The wire 84B, as shown in Fig. 3, is connected to the right hand winding of the relay 14, the lowermost relay of the pair of relays for the digit 3 in the units order. Thus when key 84 is depressed relay 14 is energized and as with the counting relays this effects energization of the relay 21, the other relay of the No. 3 pair of multiplier relays. Energization of relay 21 in turn effects energization of relay 22 which in turn effects energization of relay 23, and this in turn effects energization of relay 24 which in turn effects energization of relay 18. As the foregoing relays energize they are locked up through stick or holding circuits controlled by make-before-break contacts 16A and 16B associated with the relay 16. Thus when a pair of multiplier relays is energized all relays of lower value in the same order are also energized.

The foregoing specific description particularly relates to the multiplier relays for the units order but the multiplier relays for the tens and hundreds orders, and any additional orders if provided for, are arranged and operated in like manner.

The lowermost group of multiplier relays is for the units order, the middle group for the tens order and the upper group for the hundreds. These relays become effective one group at a time, the units first. Each group of multiplier relays includes a control relay as 16 for the units, 15 for the tens and 36 for the hundreds. Relays as 16 are prepared for energization by the closing of contacts as 18B upon the energization of relays as 18 which are the last of the group to deenergize. Relays as 16 are energized from contacts as 7C through conductors 18F and 19 and contacts as 18B, for relay 16, when relays as 18 are energized. Relays as 15 are energized from contacts as 7C through conductors 18F and 19 and contacts as 18C and conductors as 17F when relay 18 is deenergized. The control relays as 16, 15 and 36 are energized by the first of contacts as 7C to close and are deenergized by the last of contacts as 7C to open. This energization and deenergization is effected once for each time a number set up in the multiplicand relays by the multiplicand keys of Fig. 1 is to be entered in the amount manifesting device, that is to say, on the number wheels and the number of times such a number in the multiplicand relays is to be entered depends upon the number of multiplier relays that are locked up and the order in which such multiplier relays are so locked up. The multiplier relays are released by make-before-break contacts as 16A and 16B and they release a pair at a time for each digit in the multiplier in the manner above described for the counting relays, relays as 16 functioning in the manner of stepping relays as 9.

Thus if a number has been set up in the multiplicand relays and if, for example, this number is to be multiplied by 3, the key 84 is depressed energizing the relay 14 and its mate and all other relays in the group of lower numerical value in the units order of the multiplier relays. When the first entry of the number set up in the counting relays is completed the relays 14 and 21 will have been released; when the second entry of the number set up in the counting relays is completed the relays 22 and 23 will have been released; when the third or final entry of the number is completed the relays 24 and 18 will have been released.

The multiplier relays in the other orders and the multiplier relays for orders higher than the units order operate in a similar manner and it will thus be seen that a number set up in the counting relays is entered as many times for each order as there are multiplier relays locked up for that particular order. When the last or No. 1 pair of multiplier relays for any particular order release, as the relay 18, the contact thereof as 18B is opened which disables the relay as 16 for this order.

Releasing of relay 18 for the units order closes contact 18C which transfers the circuit from contacts as 7C and conductor 18F to conductor 17F and contact 17B to the control relay 15 for the tens order. Thus the control relay for the tens order will not be energized until the control relay for the units order is deenergized for contact 18C does not close until relay 18 releases and this opens contact 18B which disables relay 16. Therefore all multiplication by multiplier relays to be effected in the units order is completed before multiplication by multiplier relays in the tens order is begun, and this is also true insofar as the tens and hundreds and any higher orders are concerned, that is to say, multiplication under control of the multiplier relays of a lower order is always completed before multiplication under control of the multiplier relays for a higher order is begun.

In event there is to be no multiplication under control of multiplier relays for the units order contact 18B will be opened and the circuit will be immediately closed through contact 18C to the tens order and so on from the tens order to the hundreds order and for any higher orders. Moreover, if multiplication is to be effected, for example, first under control of multiplier relays for the units order and next by multiplier relays for the hundreds order as when no multiplier relays for the tens order are locked up, the contact 17B will be opened and the contact 17C will be closed so that when the contact 18B opens and the contact 18C closes circuit will be immediately transferred to the hundreds order.

The energization of relays as 18 closes contacts as 18X whereupon relay 79 is energized by reason of the grounding of conductor 79C. Energization of relay 79 closes contact 79A and opens contact 79B which, as stated, breaks circuit to the releasing magnet 56 and prepares a circuit for momentarily grounding conductor 76A on all repeated entries of the numbers set up in the multiplicand relays after the first entry. It will be seen that energization of relay 79 is under control of the lowermost relay of the multiplier relays for the various orders, and therefore when the lowermost relay of the highest order having multiplier relays locked up therein deenergizes the relay 79 releases, closing contact 79B. Slow-to-release relays 77 and 78 will be energized at this time but when relay 77 releases, contact 77B closes grounding contacts 78A, 79B and 80D and conductor 80F to energize release magnet 56 whereupon locked down keys of Fig. 1 are released. Relay 78 next releases to open contact 78A whereby magnet 56 is deenergized.

When relays as 18 release, contacts as 18D ground conductors as 18E (Fig. 3) and conductor 18E (Fig. 4), contact 111, wiper 112, conductor 112A and relay 107, battery being subsequently supplied to this relay through conductor 107D (Fig. 4), conductor 107D (Fig. 3), and contacts as 15C associated with control relays for the tens and higher orders. Therefore closing of contacts as 15C energizes relay 107 which has the effect of setting shaft 114 of the order switching mechanism in motion by grounding of clutch 113 from contact 107A. The effect of movement of the shaft 114 is to shift wipers as 112 to advance the multiplying action to a higher order.

Relays 16, 15 and 36 have contacts as 16D which control energization of the carry-over control slow-to-release relay 26, which relay delays entry of any carry-overs until all multiplication under control of multiplier relays is completed.

*Order switching mechanism. Fig. 4*

In Fig. 4 I have conventionally illustrated a motor 129 and have shown shafts and gears 129A and 129B for imparting rotation to the several shafts shown in Fig. 4.

The shaft 114 is part of a switch generally indicated by 130 for shifting the operating circuits of the multiplicand relays (Fig. 3) from a lower order to a higher order of number wheels as multiplication advances from lower to higher orders of multipliers and also for returning the apparatus to initial or units order position during a zero-setting operation. The shaft 114 is driven by the clutch 113 under control of relay 107 in a multiplying operation and under control of cam 114B, contact 128, conductor 128A and contact 108G of zero-setting relay 108 in a zero-setting operation. In each movement of shaft 114 to shift wipers as 112 from one contact to the next higher contact, the toothed wheel 114C closes contact 114A to energize slow-to-release relay 106. Energization of relay 106 prevents energization of clutches as 103A during movement of the shaft 114 inasmuch as circuit to battery through contact 107B is opened by the energization of relay 106 opening contact 106A.

Shaft 114 carries a wiper 112 for setting up one leg of a circuit to advance the shaft from one step to the next and it also carries wipers 115, 116 and 117 for advancing the operating circuits of the multiplicand relays to higher orders in a multiplying operation. Each wiper has access to three contacts in the present instance, where number wheels are provided in the manifesting device for three orders of numbers and a greater or less number of contacts would be provided for cooperation with the wipers depending upon the number of number wheels provided. These contacts are so wired that wiper 115 in its first or normal position is connected through contact 101, and conductor 101A to clutch 103A of the number wheel for the units order; in its second position through contact 118, and conductor 102A to clutch 104A of the number wheel for the tens order; and in its third position through a contact and conductor with the clutch 105A of the hundreds order.

When the wiper 115 is connected to the clutch 103A of the units order, the wiper 116 is connected to the clutch 104A for the tens order and the wiper 117 to the clutch 105A for the hundreds order. These wipers remain in these normal positions for a multiplication effected by locked up multiplier relays in the units order and during addition. When, however, multiplication is to be effected by locked up multiplier relays in the tens order, the wipers engage their respective second contacts and similarly the wipers engage their respective third contacts when multiplication is to be effected by locked up multiplier relays in the hundreds order and if additional orders were provided for, the wipers would successively advance in this manner.

Wiper 112 controls shifting of the shaft 114 and the contacts 111, 111A, etc. with which it cooperates are so sized that wiper 112 makes contact with contact 111A before its engagement with contact 111 is broken and so on as it progresses upwardly through the various orders. This is for the purpose of insuring a full step of the shaft 114 on each movement and it also provides for movement of the shaft through the tens order without stopping in event no multiplier relays in the tens order are locked up but multiplier relays in the units order and hundreds order are locked up. When this condition occurs and contact 111A will be grounded as well as the contact 111 and hence the relay 107 will remain energized with the effect of keeping contact 107A closed which holds ground on the clutch 113 to maintain energization thereof. Similarly if a thousands order were provided for, the wiper 112 would continue on through the hundreds order in event no multiplication was to be performed under control of multiplier relays locked up in the hundreds order and this would be equally true of other higher orders if provision were made therefor.

*Zero-setting mechanism. Fig. 4*

Relay 108 is the zero-setting relay. It is energized by momentary depression of key 81 (Fig. 2) which results in closing contact 81A to supply ground through the left hand winding 108A of relay 108. Once energized relay 108 remains energized through winding 108B, contact 108C, contact 108F, and zero-setting contacts as 103C. The zero-setting contacts as 103C are under control of zero-setting wheels as 103B associated with each number wheel unit. So long as any number wheel is off its zero position the zero-setting wheel of the unit maintains the zero-setting contact associated therewith closed and conversely when each number wheel reaches zero the zero-setting wheel associated therewith permits opening of its zero-setting contact. Referring particularly to zero-setting contact 103C which is closed when the number wheel 103 is off zero and which is thereby effective upon the energization of zero-setting relay 108 to complete a circuit from ground adjacent to the right-hand winding of relay 108, through said winding, the fourth from the left contact of relay 108, closed shunting contact 103C, conductor 101A, clutch 103A, conductor 108B, and through relay contacts 106A and 107B to battery. This circuit which energizes the clutch 103A, and which is effective as a holding circuit for zero-setting relay 108, will remain closed until broken by the opening of contact 103C when number wheel approaches zero and at such time as will cause the clutch 103A to deenergize and release the number wheel 103 from the shaft 132 when said number wheel reaches zero. During reset operation each of the zero-setting contacts as 103C is operative as above described, so long as its related number wheel is off zero, to provide a holding circuit obtaining battery at relay contact 107B for holding zero-setting relay 108 energized, but when the last number wheel attains zero position the last of the zero-setting contacts is opened which frees winding 108B of battery and this results in releasing of relay 108.

Relay 108 includes a contact 108H which is opened when relay 108 is energized and this prevents grounding of contacts as 103G and 103E during a zero-setting operation, the utility of contacts as 103G being explained more fully presently.

When relay 108 is energized ground is applied to the clutches of the number wheel units which thereupon energize, if the number wheel thereof is off zero position, and this returns the number wheels to zero position, as will be explained more fully hereinafter.

*Number wheel units. Fig. 4*

Heretofore reference has been made to the number wheel units which together constitute the amount manifesting device, that is to say, the results of computations are registered on these wheels.

Each wheel unit is made up of a number wheel as 103, a zero-setting wheel as 103B with which contacts as 103C cooperate, a shunting wheel as 103D with which contacts as 103E cooperate, a carry-over contact closing wheel as 103F with which contacts as 103G cooperate, and a clutch as 103A. The several wheels of each unit and the female portion of the clutch are rotatably mounted on the shaft 132; the male portion of the clutch is attached to the shaft; and the magnetic field of the clutch is stationary. When the field is energized the male and female portions are engaged whereby the wheel unit is connected to and rotates with the shaft 132.

The zero-setting wheels as 103B and the contacts as 103C which cooperate therewith are effective in a zero-setting operation. The wheel has a drop therein at zero position and a dwell on opposite sides of the drop or notch so that as long as the number wheel is off zero position the rider of the associated contact is disposed out of the notch whereby the contact is closed. When, however, the wheel attains zero position the rider passes into the notch and the contact is opened which breaks a circuit to the clutch and stops the wheel unit in zero position.

The shunting wheels as 103D are equipped with a lobe between each digit position of the associated number wheel. A rider on the contacts as 103E, which cooperate with these wheels, rides up and down on each lobe during each digit advance of the number wheel whereby the contacts as 103E are closed and opened for each digital advance of the associated number wheel.

The contacts 103E close to shunt out stepping relays as 9 on each digital movement of the associated number wheel. These contacts (as 103E) are grounded through contact 108H when the zero-setting relay 108 is deenergized. Since contact 108H is open during a zero-setting operation closing and opening of contacts as 103E during such an operation is without effect. These contacts shunt out the stepping relays as 9 by grounding conductors as 9D. The conductors as 9D are the battery conductors for the stepping relays as 9, ground for these relays being found at the contacts as 7B of the cut-off relays. Thus, when contacts 103E open shortly after the closing thereof battery is again supplied to stepping relays as 9.

Referring particularly to the stepping relay for the units order of counting relays which is typical of all other stepping relays and circuits thereof, relay 9 is grounded through conductor 9C and contact 7B upon closing of said contact 7B. Battery is supplied to said relay through conductor 9D, wiper 115, contact 101, conductor 101A, clutch 103A, conductor 106B, which is common to all of the clutches associated with the number wheel units of the manifesting device. Conductor 106B leads to contact 106A of relay 106 which in turn is connected with contact 107B of relay 107, which contact 107B is closed as long as relay 107 is deenergized and it is connected to battery.

Contacts as 103E are connected to conductors as 101A intermediate contacts as 101 and clutches as 103A. Therefore when contacts as 103E are closed, ground is maintained on the clutch 103A which therefore remains energized but the effect of closing contact 103E is to shunt out battery to stepping relay as 9 inasmuch as two grounds and no battery are applied to this relay. Hence it is the closing and opening of contacts as 103E which effects the alternate deenergization and energization of stepping relays as 9 during the time a number set up in the counting relays is being registered on the number wheels, these contacts effecting this alternate deenergization and energization of the stepping relays as 9 in the manner and at the time heretofore explained.

Each wheel unit includes a carry-over contact-closing wheel as 103F which is equipped with a lobe 103J engageable with a rider of contacts as 103G. These lobes are positioned to effect closing of contacts as 103G during passage of a number wheel from 9 to 0 during advance thereof in a registering operation which is indicative that, during addition or multiplication, a carry-over is to be made to the next higher order. Closing of contacts as 103G energizes relays as 109 and 110 for the purpose of entering a carry in the carry-over device, as explained more fully hereinafter, whenever a carryover is required.

Contacts 103G and 104G associated with the carry-over contact-closing wheels of the wheel units for units and tens orders are grounded through contact 108H as long as relay 108 is deenergized. Thus whenever the contact 108H is closed and lobes as 103J close contacts as 103G, relays 109 and 110 for the units are grounded whereupon they energize. Relays 133 and 134 for the tens are respectively identical with the relays 109 and 110 and are energized upon closing of the contact 104G. Contact 108H is open during a zero-setting operation and therefore closing of contact 103G or 104G during a zero-setting operation is without effect.

Associated with the number wheel units for those orders into which a carry-over may be made are carry-over entering devices. In the present arrangement where the lowest order represented is units, and tens and hundreds orders are also provided for, a carry-over may be required from units to tens or from tens to hundreds. Thus a gear 123 is rigidly connected to the number wheel 104 and this gear meshes with a gear 122 rotatable on the shaft 127 and connected to part 122A of clutch 121A, which part is rotatable on shaft 127.

A shunting wheel 121 is connected to the part 121B of clutch 121A and this part and wheel are rotatable on shaft 127. The shunting wheel 121 is identical with the shunting wheel 103D, and is equipped with a lobe between each digit position of the number wheel 104. The gears 122 and 123 have a one-to-one ratio whereby the shunting wheel 121 moves in synchronism with the number wheel 104. Clutch 121A also includes a part 122B fast on shaft 127. When clutch 121A is energized, parts 121B and 122A are connected with part 122B whereby the gear 122 and shunting wheel 121 rotate with shaft 127. Shafts 127 and 132 operate synchronously so that rotation of shaft 127 is in direct timed relation with rotation of shaft 132. The manner in which the unit including shunting wheel 121 operates is explained more fully hereinafter.

A carry-over entering device identical with that just described is associated with the wheel unit for the hundreds order, gears 126 and 125 being provided which are identical respectively with the gears 123 and 122. A shunting wheel 124 is provided which is identical with the shunting wheel 121, and clutch 124A includes three parts that are connected to the elements of the unit in the manner in which the three parts of clutch 121A are connected to the elements of that unit. Identical carry-over entering devices would be provided for any higher orders provided for in the device.

Figure 5:
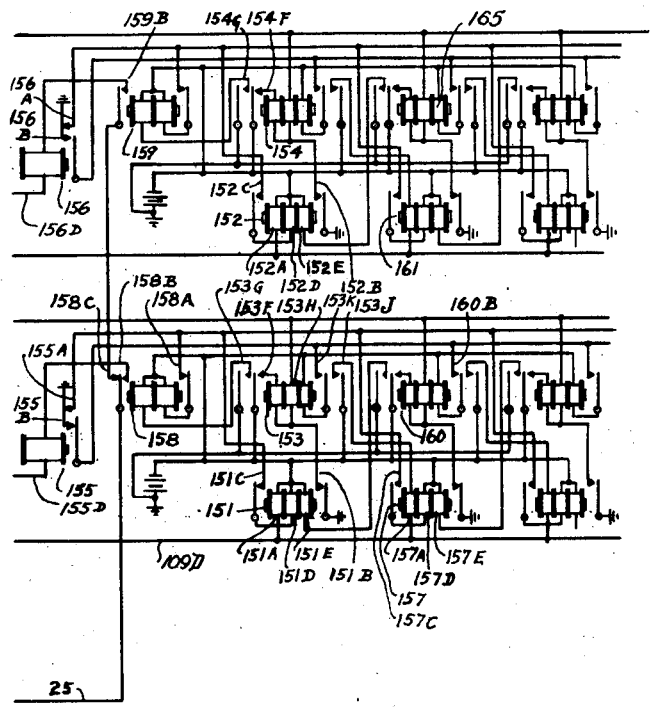
Figure 5 shows the carry-over relays.

*Carry-over relays. Fig. 5*

The relays shown in Fig. 5 are for the purpose of effecting a carry-over from one order to the next higher order. Two groups of relays are provided, each consisting of two rows of relays—one relay in each row constituting one of a pair and each pair is for the purpose of effecting the carry-over of a single carry. The lowermost group is for the purpose of effecting a carry-over from the units order into the tens order and the uppermost group is for the purpose of effecting a carry from the tens order into the hundreds order. If additional orders were provided for additional groups would be provided.

In each group I have shown three pairs of relays whereby each group is capable of accumulating three carries and if more carries need be provided for it is only necessary to provide additional pairs of relays in each group and such additional pairs would be connected in the circuit in the manner in which the various illustrated pairs are connected, that is to say, such additional pairs of relays would merely be a duplication of those illustrated.

Carries are taken up for the respective orders cumulatively. Thus in a multiplying operation more than one carry from the units order to the tens order may be required and the first carry locks up the first pair of relays, the second carry locks up the second pair of relays and so on, and this is also true of carries from the tens order into the hundreds order.

A carry entered in the carry-over relays is stored therein until the end of the operation during which the carry is entered in the relays and this is effected by locking up the pair of relays in which a carry is entered.

If during an operation wheel 103 passes from 9 to 0 the lobe 103J on wheel 103F closes contact 103G whereby ground is momentarily applied to relays 109 and 110 which thereupon energize. The energization of relay 109 closes contact 109A. Contact 110A, however, is open at this time but relay 110 deenergizes as soon as contact 103G opens. However, relay 109 remains energized since it is a slow-to-release relay. Thus when contact 110A closes, conductor 109D is grounded through contacts 109A and 110A. This grounds winding 151A of relay 151 whereupon relay 151 energizes if this is the first time conductor 109D is grounded in a particular computation. Energization of relay 151 closes contact 151C whereby ground is supplied from contact 155A to winding 151D of relay 151, thus providing a stick or holding circuit which maintains relay 151 energized. Relay 109 releases opening contact 109A and closing contact 109B. This does not release relay 151, however, since the winding 151D thereof is energized.

Energization of relay 151 closes contact 151B whereupon a circuit is prepared through winding 153H of relay 153. Contact 151B is grounded. Contact 109B is connected to battery. Therefore when contact 109B closes relay 153 is energized through its winding 153H. Energization of relay 153 closes contact 153F which is in circuit with the left hand winding of relay 153 that is also connected to grounded contact 151B. Contact 153F is connected to battery. Thus upon energization of relay 153 and closing of contact 153F a stick or holding circuit is provided for relay 153 so that if contact 109B is subsequently opened this relay is not released so long as relay 155 remains unenergized holding relay 151 energized and grounded contact 151B closed.

Energization of relay 153 also closes contact 153K in circuit with contact 155B of stepping relay 155. The stepping relay 155 includes make-before-break contacts 155A and 155B. It will be recalled that relay 151 is locked up through contact 155A. Thus upon energization of relay 155 contact 155A will be opened and contact 155B will be closed before contact 155A opens. Therefore, even though contact 155A opens relay 153 will not release since it will be locked up through the right hand winding thereof which is in circuit with contact 153K that will at this time be grounded through contact 155B.

Energization of relay 153 closes contact 153G whereupon cut-off relay 158 is energized through its left hand winding, closing contact 158A thereof which is in circuit with contact 155A of stepping relay 155, the utility of which will be explained more fully hereinafter.

The energization of relay 153 also closes contact 153J whereby the left hand winding of relay 157 is connected to battery. This contact, 153J, was open when conductor 109D was grounded in the preceding operation and therefore relay 157 did not lock up at the time relay 151 locked up. However, if in this particular computation contact 103G again closes and energizes relays 109 and 110, conductor 109D will again be grounded whereupon relay 157 will be energized which, in the same manner as that in which the energization of relay 151 effected energization of its mate 153, will effect energization of relay 160, the mate of relay 157. Energization of relay 160 will prepare the third relay in the lower row of the lower group of carry-over relays for energization should the contact 103G be closed for a third time in this particular computation and if additional relays were provided in the group this progressive preparation for receiving energization would proceed in the manner above described.

The relays in the upper group of carry-over relays are progressively locked up in the same manner as the relays in the lower group, these lower relays of the upper group being under control of the relays 133 and 134 which, as stated, correspond to and which function the same as the relays 109 and 110 and the relays 133 and 134 are energized under control of the contacts 104G of the tens order wheel unit.

Carries entered in the carry-over relays are entered on the number wheel of the amount manifesting device at the end of the computation in which the carries were accumulated in the carry-over relays. In a multiplying operation this is under control of the slow-to-release relay 26 in a manner explained more fully hereinafter. In an adding computation the relay 26 is not energized wherefore the contact 26A thereof remains closed and, in a manner to be explained more fully hereinafter, a carry is effected at the end of the entry of a number during addition, if the entry entails a carry.

The entry of a carry is effected by grounding of the conductor 25. If the contact 26A is closed grounding of conductor 25 is under control of contacts associated with the cut-off relays of the counting relays; namely, the contacts 7D, 8D and 37, and all of these contacts must be closed by the deenergization of all of the cut-off relays of the counting relays before conductor 25 is grounded. Hence since the cut-off relays of the counting relays are not deenergized until all of the counting relays are deenergized a carry-over cannot be effected until the counting relays, that is to say, the entry means, have completed their operation.

When carries are to be entered in the amount manifesting device, it is essential that they be entered progressively. For example, the carry from the units order to the tens order may cause the number wheel for the tens order to pass from 9 to 0 which will close the contact 104G and lock up another pair of relays in the upper group of carry-over relays. Hence, progressive entry of the carries insures accurate entry thereof.

In order to insure, in adding and in multiplying computations, that the carry-over from a lower order to a higher order will be effected progressively from the lowest to the highest the relay 158 is provided with contacts 158B and 158C. The relay 158 is energized whenever a carry has been entered in the lower group of carry-over relays. Such energization of the relay 158 disconnects conductor 25 from contact 158C and connects it with contact 158B. Contact 158C is connected with contact 159B controlled by the cut-off relay 159 of the next higher order and therefore even though the contact 159B of this higher order is closed a carry-over cannot be effected from the higher order until relay 158 deenergizes which will be the last step in effecting a carry from the units to the tens order. An arrangement identical with this would be associated with the cut-off relay for the hundreds order of carry-over relays if provision were made for a carry-over from hundreds to thousands and an identical arrangement would be provided if a carry-over were to be effected into any higher order.

As has been explained, whenever a carry is to be effected from the units order to the tens order the cut-off relay 158 is energized wherefore the conductor 25 is connected to the contact 158B. The contact 158B is in series with the stepping relay 155 and the clutch 121A. Hence when conductor 25 is grounded and contact 158B is closed stepping relay 155 and clutch 121A are energized.

Energization of clutch 121A sets shunting wheel 121 and gear 122 in motion with shaft 127 and since gear 122 meshes with gear 123 the wheel unit for the tens order is set in motion. Shortly after the shunting wheel 121 is set in motion the shunting contact 121E associated therewith is closed. This shunting contact is connected to the conductor 121F which interconnects the relay 155 and clutch 121A. Closing of contact 121E grounds conductor 121F. This prevents deenergization of clutch 121A but deenergizes stepping relay 155. The wheel 121 continues to rotate and contact 121E opens whereupon relay 155 is reenergized before the entry of a carry is completed. Thus it will be seen that deenergization and reenergization of the stepping relay 155 is under control of the shunting wheel 121. This deenergization and reenergization of stepping relay 155 has the effect of releasing step by step energized carry-over relays in the lower group of such relays.

If, for example, pairs 157 and 160 and 151 and 153 of carry-over relays have been energized and conductor 25 is grounded relay 155 is energized and clutch 121A is engaged which sets wheel 121 in motion. The energization of relay 155 makes contact 155B and breaks contact 155A wtih a make-before-break effect. Breaking of contact 155A releases relay 157. However, relay 160 remains energized by reason of the fact that contact 155B is closed. But shortly after the wheel 121 starts to move contact 121E is grounded. This deenergizes relay 155 whereupon contact 155A is closed before contact 155B is opened. Opening of contact 155B releases relay 160 but relay 151 remains energized by reason of the fact that contact 155A is closed. However, prior to the time the first carry is entered on the number wheel 104 the contact 121E opens, reenergizing relay 155 making contact 155B before contact 155A is opened. Opening of contact 155A releases relay 151 but contact 155B holds relay 153 energized.

Wheels 104 and 121 continue to rotate and shortly after the start of the entry of the second carry on the wheel 104 contact 121E closes whereupon relay 155 deenergizes thus making contact 155A before opening contact 155B. When contact 155B opens relay 153 releases. This, however, does not release cut-off relay 158 which remains energized through its right hand winding under control of contact 155A. Shortly before the entry of the second carry is completed, contact 121E opens reenergizing stepping relay 155, closing contact 155B (without effect) and opening contact 155A. Opening of contact 155A deenergizes relay 158 which thereupon releases, opening contact 158B and closing contact 158C. Opening of contact 158B frees relay 155 and clutch 121A from ground whereupon relay 155 deenergizes and clutch 121A releases. The clutch is fully released at the time the entry of the second carry is completed.

It will be noted that deenergization of relay 158 closes contact 158C. Therefore, if a carry has been entered in the upper group of carry-over relays, contact 159B will be closed whereupon closing of contact 158C will apply ground to stepping relay 156 and clutch 124A through said contact 158B and this relay and clutch will be energized. Hence the hundreds wheel 105 will be set in motion so that any carry accumulated in the upper group of carry-over relays will be entered on the hundreds number wheel 105, this being effected under control of the contact 124E in the same manner as that in which the contact 121E controls the entry of a carry on the tens number wheel 104.

Description of Operation

Adding and multiplying calculations and carry-overs entailed therein are described in detail hereinafter and the manner in which subtracting operations may be performed is briefly explained, such calculation in the main entailing reversing the direction of rotation of the number wheels of the result manifesting device.

The following detail descriptions are merely typical examples of calculations and any other numbers within the capacity of the machine could be added or multiplied in the manner hereinafter described.

Addition

For the sake of simplicity, the example of adding 34 to 34 is described herein. The first step in this addition consists in registering 34 and this operation is then repeated to add 34 to the initially entered 34.

*Registering 34.*—The first step in registering 34 in the result manifesting device is to press and lock down the keys 52 and 51, the 3 and 4 keys in the tens and units order respectively. Such pressing of the keys is indicated at point 200 on the timing chart shown in Fig. 6. This chart specifically pertains to the entry of the digit 4 on the units wheel 103 and is typical of the entry of all numbers on the number wheels. Pressing and locking down of key 51 closes contact 51A associated therewith and pressing and locking down of key 52 closes contact 52A associated therewith. After these keys are locked down starting key 76 is momentarily depressed, as at point 201, (Fig. 6), grounding conductor 76A which grounds conductor 51B through closed contact 51A. This energizes relay 3 which thereupon locks up at point 202 and closes contact 3B which results in grounding relay 5 at point 202A whereupon relay 5 energizes at point 202′, and as previously explained, the energization of the other counting relays of lower value in this group thus follows, the relays energizing one after the other, that is to say, relays 27, 28, 29, 30, 31 and 32 energize one after the other. Energization of relay 32 at point 203 closes contact 32C which grounds cut-off relay 7 at point 203A.

Grounding of conductor 76A also grounds conductor 52B through closed contact 52A which causes relay 4 to be energized as well as its mate, relay 6, and those pairs of relays of lower value in this chain or group of relays and, as before described, this results in energization of the cut-off relay 8.

Thus in the foregoing manner counting relays for 3 in the tens and 4 in the units are locked up.

After energization of relay 7 at point 204 contact 7B closes, grounding conductor 9C and starting energization of relay 9 at point 205 and also starting energization of clutch 103A at point 210. When relay 9 energizes at point 211 contact 9A opens and deenergizes relay 3 which thereupon starts to release at point 212. Energization of relay 8 closes contact 8B grounding conductor 10C which energizes stepping relay 10 and engages clutch 104A.

Engagement of clutches 103A and 104A sets the number wheel units including the number wheels 103 and 104 in motion with shaft 132, engagement of clutch 103A being indicated at point 213. Shunting wheel 103D rotates with number wheel 103 and shortly after the start of rotation of wheel 103 at point 213 shunting wheel 103D closes contact 103E which shunts out stepping relay 9 which thereupon starts to deenergize at point 214. Upon deenergization of relay 9 at point 215 contact 9B opens whereupon relay 5 starts to release at point 216. Shortly before wheel 103 has rotated sufficiently to complete the entry of the first digit "1" thereon, shunting wheel 103D opens contact 103E whereupon shunt is removed from relay 9 which thereupon at point 217 starts to energize and when relay 9 is energized at point 218 contact 9A opens whereupon relay 27 starts to deenergize at point 219.

Wheel 103 continues rotation and at point 220 the first digit "1" is entered on wheel 103D. Continued rotation of shunting wheel 103D with wheel 103 brings the second lobe on this shunting wheel into position to again close shunting contact 103E and this occurs shortly after the start of the entry of the second digit "2". Upon closing of shunting contact 103E at this time relay 9 starts to deenergize at point 221. When relay 9 is released at point 222 contact 9B opens whereupon relay 28 starts to release at point 223. Shortly before the completion of the entry of the second digit "2" on wheel 103 shunting wheel 103D opens contact 103E whereupon relay 9 at point 224 starts to energize and when this relay is energized at point 225 contact 9A opens whereupon at point 226 relay 29 starts to release. Shortly thereafter, at point 230, the second digit "2" is entered on the number wheel 103.

Number wheel 103 and shunting wheel 103D continue rotation and shortly after the start of entry of the third digit "3" on the number wheel 103 shunting wheel 103D again closes contact 103E whereupon at point 231 relay 9 starts to deenergize. When relay 9 is deenergized at point 232 contact 9B opens and thereupon at point 233 relay 30 starts to release. Shortly before the completion of the entry of the third digit "3" shunting wheel 103D opens contact 103E whereupon relay 9 starts to energize at point 234 and when energized at point 235 contact 9A opens and thereupon at point 236 relay 31 starts to release. Shortly thereafter, at point 237, the entry of the third digit "3" is completed and the entry of the fourth digit "4" begins.

As shunting wheel 103 D rotates with number wheel 103 in the entry of the fourth digit "4" the fourth lobe on the shunting wheel closes contact 103E whereupon at point 238 relay 9 starts to deenergize and when deenergized at point 239 contact 9B opens and thereupon at point 240 relay 32 starts to release. Continued rotation of shunting wheel 103D causes this wheel to open contact 103E and when this contact is opened relay 9 starts to energize at point 241. When relay 9 is energized at point 242 cut-off relay 7 starts to deenergize at point 243. When relay 7 is deenergized at point 244 contact 7B opens whereupon circuit to stepping relay 9 and clutch 103A is broken so that at point 245 stepping relay 9 starts to deenergize and at point 246 clutch 103A starts to disengage. When clutch 103A is completely disengaged at point 247 rotation of number wheel 103 ceases and the fourth digit "4" is fully entered thereon.

As the wheel 104 rotates shunting wheel 104D closes and opens shunting contact 104E whereby the relays 4 and 6 and other relays of less numerical value in this group successively release and during the entry of the third digit the cut-off relay 8 releases with the result that by the time the entry of the third digit on the wheel 104 has been completed the clutch 104A will have released stopping this wheel unit. The wheel 103 continues movement after the wheel 104 has stopped since four digits are entered on this wheel whereas only three are entered on the wheel 104.

When the wheels 104 and 103 cease movement they register 34.

When cut-off relay 8 energized, which was the first cut-off relay to energize since only three pair of counting relays were locked up in the tens order, while four pair were locked up in the units order, contact 8C closed, grounding conductor 77C whereupon relay 77 was energized which resulted in closing contact 77A whereupon relay 78 was energized.

Figure 6:
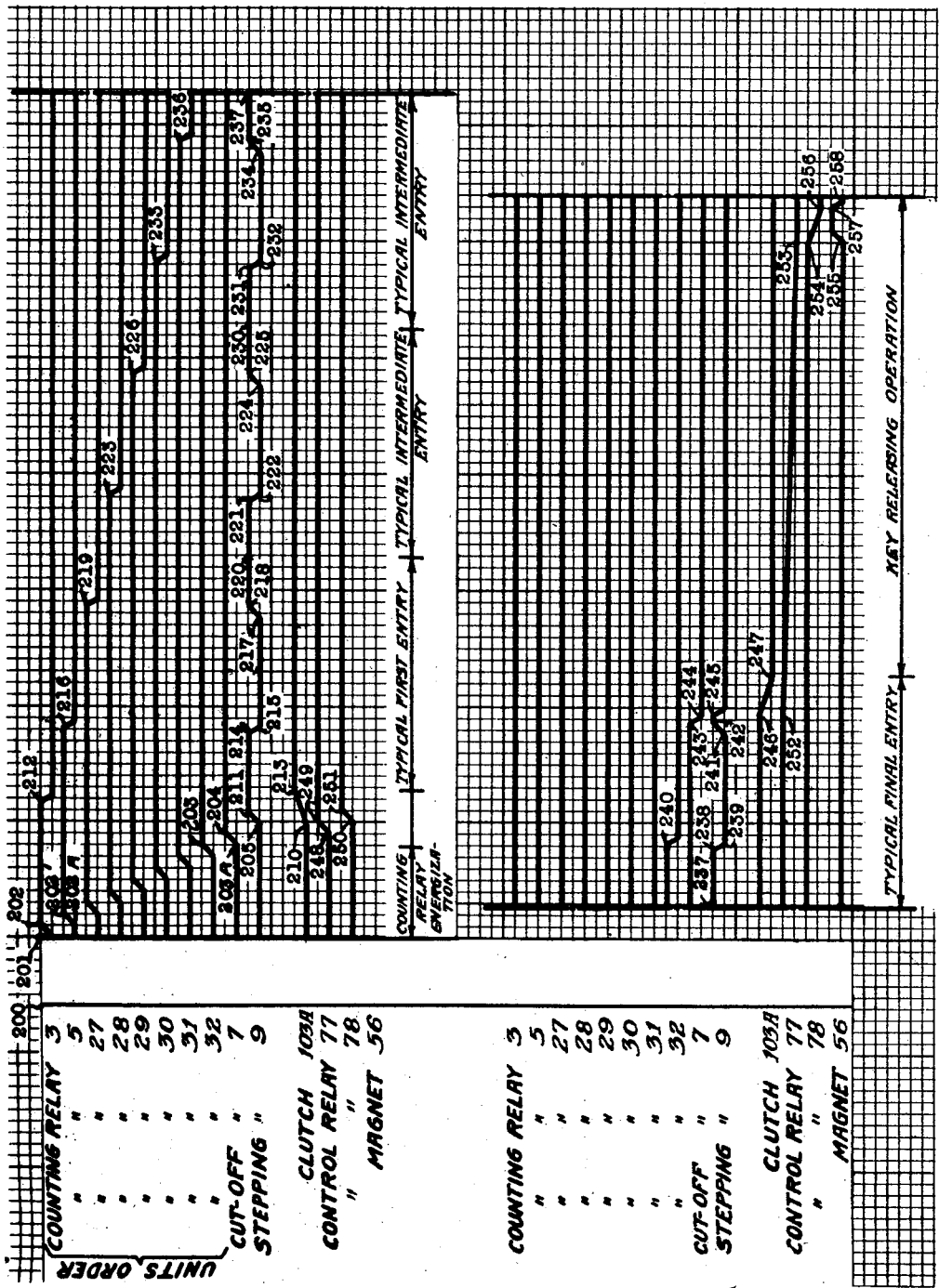
Figures 6 to 12 are timing charts of various operations described more fully hereinafter in that part of the specification wherein exemplary operations of the machine are explained in detail.

In the timing chart, Fig. 6, it is assumed that it is the energization of relay 7 that effects the energization of relay 77. In reality, of course, it is the first of the cut-off relays to energize, which results in closing of contacts as 7C or 8C, that causes the energization of relay 77 and in the present instance contact 8C closes before contact 7C as just explained. However, the operation of relays 77 and 78, insofar as energization of relay 77 is concerned, is always the same, so assuming that it is the closing of contact 7C that is to effect energization of relay 77, the closing of this contact 7C prior to the closing of contact 7B starts energization of relay 77 at point 248 in Fig. 6. When relay 77 is energized at point 249 contact 77A closes whereupon relay 78 starts to energize at point 250 and this relay is energized at point 251. The relays 77 and 78 continue energized until the last of the energized cut-off relays releases.

When the last of the cut-off relays for the counting relays deenergizes, in this instance relay 7, since four digits are entered in the units order and only three digits are entered in the tens order, the contact 7C opens and since contact 8C has previously opened conductor 77C is thereupon freed from ground whereupon slow-to-release relay 77 is deenergized and starts to release at point 252 in Fig. 6. When relay 77 releases at point 253 contact 77A is opened and contact 77B is closed. Opening of contact 77A starts the release of slow-to-release relay 78 at point 254. However at the time contact 77B closes at point 253 relay 78 is still energized. Therefore ground is applied to magnet 56 from contact 77B through closed contacts 78A, 79B and 80D and conductor 80F wherefore magnet 56 starts to energize at point 255. Subsequently slow-to-release relay 78 releases at point 256 opening contact 78A freeing magnet 56 from ground which thereupon starts to deenergize at point 257. Energization of magnet 56 releases locked down keys 52 and 51 and upon release of this magnet at point 258 the machine is ready for a second operation particularly since all relays will also be released.

*Adding 34 to 34.*—Wheels 104 and 103 now register 34 and since 34 is to be added to 34 keys 52 and 51 are again depresed and locked down and starting key 76 is again momentarily depressed and the above described operation is repeated.

At the end of this second operation the wheels 104 and 103 register 68, the sum of 34 plus 34.

*Zero-setting operation.*—Since the desired addition has now been completed it is now desirable to return the number wheels to zero. Hence zero-setting key 81 is momentarily pressed which grounds conductor 81B whereupon zero-setting relay 108 is energized opening contact 108H but closing the other contacts of this relay. Opening of contact 108H prevents grounding of contacts 103E and 103G and like contacts of other number wheel units so that these contacts will not effect operations during a zero-setting operation even if they are closed during such an operation.

Relay 108 locks up through winding 108B, contacts 108C and 108F. If wheel 103, for example, is off zero position circuit will be closed through contact 103C whereby clutch 103A is grounded and energized which sets the wheel unit including number wheel 103 in motion. This same condition prevails for the other wheel units which are off zero position and hence clutch 104A will be energized and the wheel unit including the number wheel 104 will be set in motion. Inasmuch as the wheel unit including the number wheel 105 is in zero position the zero-setting contact thereof will be open and therefore clutch 105A will not be energized. Battery is supplied to the clutches 103A and 104A through conductor 106B, contact 106A and contact 107B. When the wheels 103 and 104 attain zero position the riders of contacts 103C and 104C enter the notches in wheels 103B and 104B, respectively, whereupon these contacts open and when the contact for a particular wheel unit opens the clutch of this wheel unit is deenergized whereupon the wheel stops. Thus when both the contacts 103C and 104C open the wheel units including the number wheels 103 and 104 stand at zero along with the wheel unit including the number wheel 105. When the last of the zero-setting contacts as 103C opens contacts 108F and 108C are freed from battery whereupon winding 108B of relay 108 is deenergized and relay 108 releases.

Figure 7:
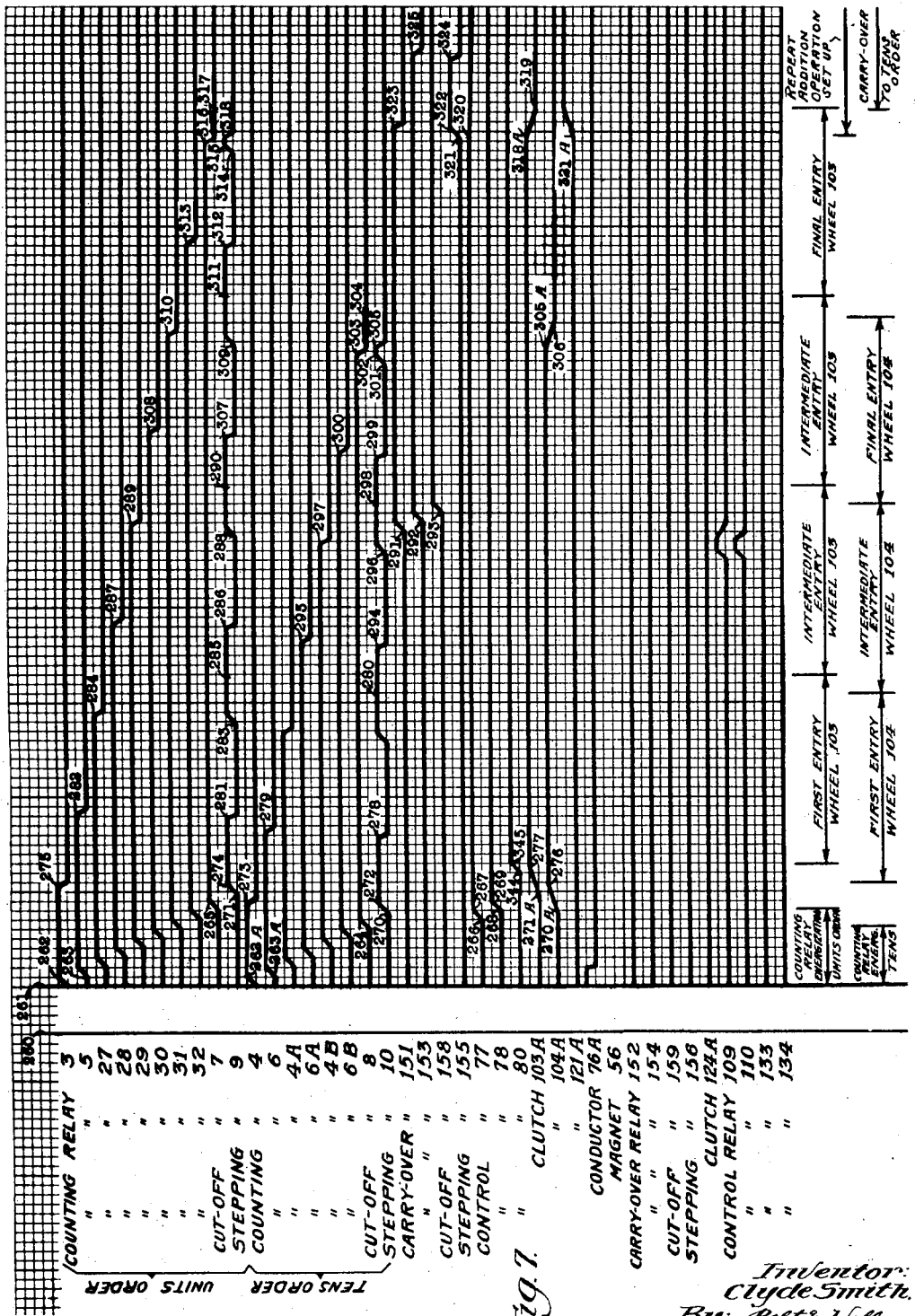
Figure 8:
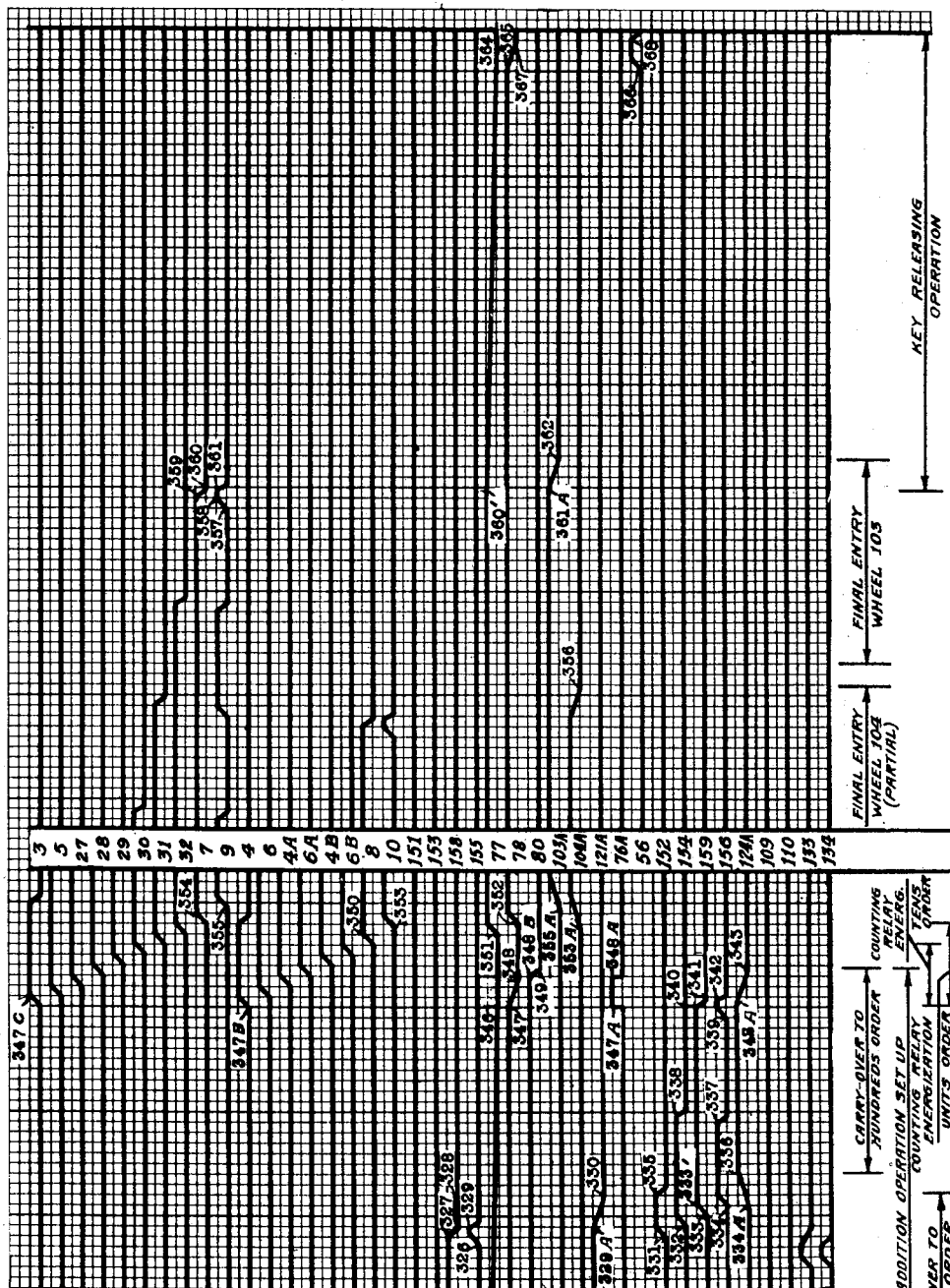

*Repeat operation in addition.*—A repeat operation in addition is shown in the timing chart, Figs. 7 and 8. In this instance it is assumed that 68 stands on the number wheels 104 and 103 just as it did prior to the just described zero setting operation. Referring to the timing chart shown in Fig. 7, the keys 51 and 52 are again manually pressed and locked down at the point 260. Subsequently, and at the point 261, the starting key 76 is pressed whereupon the contacts 52A and 51A are grounded wherefore through conductors 52B and 51B, (Fig. 1), conductors 52B and 51B (Fig. 3), the middle windings of counting relays 4 and 3 are grounded and these relays thereupon energize at points 262 and 262A. Energization of these two relays initiates energization of their mates 5 and 6 at the points 263 and 263A and thereupon in the manner previously described other pairs of counting relays of lower numerical value in the tens and units orders of counting relays energize one after the other. Since, in this instance, where 34 is to be added to 68, only three pairs of counting relays are to be locked up in the tens order while four pairs are to be locked up in the units order, the cut-off relay 8 for the tens order is energized at the point 264 prior to the time the cut-off relay 7 for the units order is energized at the point 265.

The energization of relay 8 at point 264 closes contact 8C wherefore relay 77 starts to energize at the point 266 and at the point 267 where this relay is energized contact 77A closes wherefore at the point 268 the relay 78 starts to energize and at the point 269 said relay 78 is energized. It is the first of contacts as 7C or 8C to close that initiates this energization of relays 77 and 78 but it is the last of such contacts to open that initiates the deenergization and release of these slow-to-release relays. Hence, since only three pairs of counting relays are locked up in the tens order and as four pairs of counting relays are locked up in the units order the contact 8C will be the first to close but the contact 7C will be the last to open and hence relays 77 and 78 continue energized until opening of contact 7C initiates deenergization thereof and this does not occur until after 34 has been entered on the number wheels 104 and 103.

Energization of the cut-off relay 8 at the point 264 also closes contact 8B subsequent to the closing of the contact 8C and when contact 8B closes, ground is applied to stepping relay 10 and clutch 104A and hence at point 270 relay 10 starts to energize and at point 270A clutch 104A starts to energize.

Subsequently, at point 265 relay 7 is energized closing contact 7B after the closing of contact 7C, this closing of contact 7C, however, being without effect inasmuch as contact 8C closed previously and initiated energization of relay 77. Closing of contact 7B applies ground to stepping relay 9 and clutch 103A wherefore relay 9 starts to energize at point 271 and clutch 103A starts to energize at point 271A. When clutch 104A is engaged at point 276 the wheel unit including number wheel 104 takes motion and subsequently when clutch 103A is engaged at point 277 the wheel unit including number wheel 103 takes motion.

The shunting wheel 104D closes and opens the shunting contact 104E as wheel 104 rotates and upon the first closing of shunting contact 104E stepping relay 10 starts to release at the point 278 and when relay 10 is released counting relay 6 starts to release at the point 279. When shunting contact 104E first opens, stepping relay 10 reenergizes and thereupon the next counting relay 4A releases and subsequent to this the first digit "7" is entered upon wheel 104 at point 280, this wheel having stood at "6" at the start of the operation.

The shunting wheel 103D closes and opens shunting contact 103E as it rotates with wheel 103 and upon the first closing of shunting contact 103E stepping relay 9 is freed of battery and starts to release at the point 281 and when released the counting relay 5 starts to release at the point 282. When the shunting contact 103E first opens relay 9 starts to energize at the point 283 and when energized the counting relay 27 starts to release at the point 284. Subsequently, the digit "9" is entered on the wheel 103 at the point 285, this wheel having stood at 8 at the start of the operation.

Wheel 103 continues rotation and shortly after the entry of the digit "9" on wheel 103 the shunting contact 103E again closes and thereupon at point 286 the stepping relay 9 starts to release. Upon release of relay 9 the relay 28 starts to release at the point 287. Thereafter the shunting contact 103E opens and at this time, at the point 288, the stepping relay 9 starts to energize and when this relay is energized the counting relay 29 starts to release at the point 289. Shortly thereafter at the point 290 the digit "0" is entered on wheel 103.

It will be noted that the wheel 103 passed from 9 to 0 in this last entry operation which necessitates that a carry be made into the next higher or tens order. As the number wheel passes from 9 to 0 the lobe 103J on carry-over contact wheel 103F closes carry-over contact 103G whereupon relays 109 and 110 start to energize and almost immediately lobe 103J disengages contact 103G whereupon relay 110 starts to deenergize and when deenergized closes contact 110A. Such operation of the relays 109 and 110 is charted on the timing chart pertaining to multiplication and which is explained hereinafter. Closing of contact 110A starts the energization of relay 151 at point 291 and when this relay is energized contact 151B closes whereupon at point 292 relay 153 starts to energize. When relay 153 is energized contact 153G closes whereupon at point 293 relay 158 starts to energize. Hence a carry from the units order to the tens order is locked up in carry over relays 151 and 153, which remain energized until this entry of 34 onto the wheels 104 and 103 is completed.

Wheel 104 continued rotation after the digit "7" was entered thereon at point 280 and shortly after entry of the digit "7" thereon shunting wheel 104D closed shunting contact 104E whereupon at the point 294 the relay 10 started to release. When relay 10 is released and at the point 295 the counting relay in the tens order of the highest numerical value that is still locked up starts to release. Wheel 104 continues rotation and consequently the lobe on shunting wheel 104D causes contact 104E to open and upon opening of this contact, at the point 296, relay 10 starts to energize and when relay 10 is energized contact 10A opens whereupon the next of the counting relays in the tens order starts to release at the point 297. Shortly thereafter and at the point 298 the digit "8" is entered on wheel 104 which continues rotation and shortly after the entry of the digit "8" thereon shunting wheel 104D closes contact 104E whereupon relay 10 starts to deenergize at point 299. When relay 10 is deenergized contact 10B opens whereupon the upper relay of the No. 1 pair of counting relays in the tens order starts to release at the point 300. Further rotation of the shunting wheel 104D with the wheel 104 opens contact 104E whereupon at point 301 stepping relay 10 starts to energize. Upon energization of stepping relay 10 at the point 302 contact 10A opens whereupon at point 303 cut-off relay 8 starts to release. When cut-off relay 8 is released at point 304 stepping relay 10 starts to release at point 305 inasmuch as the release of relay 8 at point 304 opens contact 8B wherefore circuit to stepping relay 10 is opened. The opening of contact 8B also opens circuit to clutch 104A which starts to release at point 305A and when this clutch is released or completely disengaged at point 306 the digit "9" will be fully entered on number wheel 104 and rotation of this wheel will cease. When cut-off relay 8 released at point 304 contact 8C opened without effect, however, inasmuch as contact 7C will still be closed because the counting relays in units order are not as yet all released due to the fact that four digits are being entered on the units order number wheel 103, whereas only three digits are being entered on the tens order number wheel 104.

Hence, the entry operation in the units order will not be completed at the time the tens order in the operation is completed and after the entry of the digit "0" on wheel 103 at the point 290 wheel 103 continued rotation and shunting wheel 103D closed contact 103E whereupon at the point 307 stepping relay 9 started to release. The complete release of relay 9 opens contact 9B whereupon at point 309 relay 30 starts to release. Thereafter shunting wheel 103D opens contact 103E whereupon at point 309 stepping relay 9 starts to energize. The completed energization of relay 9 opens contact 9A whereupon at point 310 relay 31 starts to release. Wheel 103 continues rotation and shortly after release of relay 31 the digit "1" is entered on wheel 103 at point 311.

Continued rotation of wheel 103 causes closing of contact 103E and when this contact 9 is closed relay 9 starts to deenergize at point 312. When relay 9 is released, contact 9B opens, starting the release of relay 32 at point 313. Further rotation of wheel 103 causes contact at 103E to open whereupon at point 314 stepping relay 9 starts to energize. When relay 9 is energized at point 315 contact 9A opens whereupon cut-off relay 7 starts to release at point 316. When cut-off relay 7 is released at point 317 contact 7B opens whereupon circuit to stepping relay 9 and clutch 103A is opened and stepping relay 9 starts to release at point 318 and clutch 103A starts to release at point 318A. When clutch 103A is fully released at point 319 the digit "2" is fully entered on wheel 103.

When cut-off relay 7 released at point 317 contact 7C opened whereupon at point 320 slow-to-release relay 11 started to release. Furthermore, release of cut-off relay 7 at point 317 closed contact 7D with the effect of grounding conductor 25 and this grounding of conductor 25 initiated energization of stepping relay 155 at point 321 and also initiated energization of clutch 121A at point 321A. This sets the wheel unit including number wheel 104 in motion and also shunting wheel 121. The energization of relay 155 at point 322 opened contact 155A whereupon relay 151 started to release at point 323.

Shortly after wheel 121 started rotation the first lobe thereon closed contact 121E whereupon at point 324 stepping relay 155 started to deenergize and when this relay is deenergized contact 151B opens whereupon at point 325 carryover relay 153 starts to release. Wheel 121 continues rotation and causes shunting contact 121E to open and opening of this contact initiates energization of stepping relay 155 at point 326. When stepping relay 155 is energized contact 155A opens wherefore at point 327 cut-off relay 158 starts to deenergize. When cut-off relay 158 is deenergized at point 328 circuit to contact 158B is opened and circuit to contact 158C is closed. Opening of circuit to contact 158B initiates deenergization of stepping relay 155 at point 329 and also initiates release of clutch 121A at point 329A. When clutch 121A is fully released at point 330 the number wheel 104 displays the digit "0".

Thus in effecting the carry-over from the units order to the tens order the number wheel 104 advanced from 9 to 0 and while so advancing the lobe 104J closed contact 104G whereupon relays 133 and 134 energized. Lobe 104J quickly disengages contact 104G which thereupon opens and starts deenergization of relays 134 and 133 and when relay 134 is deenergized, prior to deenergization of relay 133, contact 134A closes whereupon at point 331 carry-over relay 152 starts to energize. When relay 152 is energized contact 152B is closed and thereupon at point 75

332 relay 154 starts to energize. When relay 154 is energized contact 154G closes whereupon cut-off relay 159 starts to energize at point 333. These relays 152, 154 and 159 are locked up and energized before the entry of the carry from the units order into the tens order is completed. The energization of relay 159 at point 333' closes contact 159B and circuit to this contact is closed by this time since relay 158 released at point 328 and closed contact 158C. Thus, when contact 159B closes, ground is applied to stepping relay 156 and clutch 124A which initiates energization of stepping relay 156 at point 334 and also initiates energization of clutch 124A at point 334A.

Energization of stepping relay 156 opens contact 156A whereupon relay 152 starts to release at point 335. When clutch 124A is energized at point 336 the number wheel unit including wheel 105 takes motion as does shunting wheel 124. Thus, as shunting wheel 124 rotates it closes contact 124E whereupon stepping relay 156 starts to deenergize at point 337. When this relay is deenergized contact 156B opens whereupon relay 154 starts to release at point 338. Further rotation of wheel 124 causes shunting contact 124E to open and when this contact is opened stepping relay 156 starts to energize at point 339 and when this relay is energized contact 158 opens which initiates release of cut-off relay 159 at point 340. Release of cut-off relay 159 at point 341 opens contact at 159B whereupon stepping relay 156 starts to release at point 342 and clutch 124A starts to release at point 342A. When clutch 124A is released at point 343 the digit "1" is entered on number wheel 105.

Hence, at this time the number wheels 105, 104 and 103 display 102, the sum of 68 plus 34.

In the just described operation immediately after number wheel 104 took motion, or, after relay 78 energized to close grounded contact 78B the operator pressed key 82 grounding the contact associated therewith and thereupon at point 344 relay 80 started to energize and when this relay was energized at point 345 contact 80D was opened and contact 80E was closed. The grounded contact 78B then provided a holding circuit for relay 80 through contact 80C and winding 80B.

Prior to the time clutch 124A started to release at point 342A, slow-to-release relay 77 released at point 346 whereupon contact 77A opened which initiated deenergization of relay 78 at point 347. Likewise at this time contact 77B closes whereupon at point 347A grounding conductor 76A is grounded, circuit being closed from contact 77B through closed contacts 78A and 80E.

Grounding of conductor 76A at point 347A grounds contacts 52A and 51A associated with locked down keys 52 and 51 which were not released at the end of the entry of 102 on the wheels 105, 104 and 103 since circuit to release magnet 56 was opened at contact 80D. The grounding of contacts 52A and 51A initiate energization of counting relays 4 and 3 at points 347B and 347C whereupon the mates of these counting relays and counting relays of lower numerical values in the tens and units order lock up one after the other.

Slow-to-release relay 78 started deenergization at point 347 and deenergized at point 348 which is subsequent to the energization of counting relays 4 and 3 at points 347B and 347C. The release of relay 78 at point 348 opens contact 78A wherefore at point 348A grounding conductor 76A is freed of ground. Likewise the release of relay 78 at point 348 opens contact 78B which initiates deenergization of relay 80 at point 348B. When relay 80 is released at point 349 contact 80E opens and contact 80D closes so that circuit from contact 77B to grounding conductor 76A is broken and circuit to release magnet 56 is established but not energized since by this time contact 78A is open due to release of relay 78 at point 348.

The energization of the counting relays in the tens and units order, one after the other, results in the energization of the cut-off relays 8 and 7 of these orders, cut-off relay 8 energizing prior to cut-off relay 7. When cut-off relay 8 energizes at point 350 contact 8C closes whereupon at point 351 relay 77 starts to reenergize. When relay 77 is energized contact 77A is closed which initiates energization of relay 78 at point 352. Likewise, subsequent to the closing of contact 8C upon the energization of relay 8 at point 350, contact 8B closed, initiating energization of stepping relay 10 at point 353 and also initiating energization of clutch 104A at point 353A. Furthermore, the energization of cut-off relay 7 at point 354 closed contact 7C without effect since contact 8C had previously closed. Subsequently contact 7B closed. The closing of contact 7B initiates energization of stepping relay 9 at point 355 and also initiates energization of clutch 103A at point 355A. Thereafter the entry of another 34 onto wheels 104 and 103 proceeds in a manner heretofore described except that in this instance no carry-over relays are energized inasmuch as the addition of 34 to 102 that stands on the wheels 105, 104 and 103 does not entail any carries, the ultimate sum being 136 which is the product of 68 plus 34 plus 34.

Again the entry of 3 on the number wheel 104 is completed prior to the entry of 4 on the number wheel 103 and at point 356 clutch 104A releases and movement of number wheel 104 ceases and at this time wheel 104 displays 3.

The number wheel 103, however, continues rotation and during the entry of the last digit "6" thereon, shunting contact 103E opens whereupon stepping relay 9 starts to energize at point 357. When stepping relay 9 is energized at point 358 contact 9A opens which initiates release of cut-off relay 7 at point 359. When cut-off relay 7 is released at point 360 release of stepping relay 9 is initiated at point 361 and release of clutch 103A is initiated at point 361A. When clutch 103A releases at point 362, number wheel 103 ceases movement and displays 6 so that at this time the number wheels 105, 104 and 103 display the sum 136.

When cut-off relay 7 released at point 360 contact 7C opened which freed relay 77 of ground and hence at point 363 slow-to-release relay 77 started to release. The release of relay 77 is completed at point 364 whereupon contact 77A opens and initiates release of slow-to-release relay 78 at point 365. Simultaneous with the release of relay 77 at point 364, contact 77B closed which initiated energization of release magnet 56 at point 366. Upon the release of slow-to-release relay 78 at point 367 circuit to release magnet 56 is broken which thereupon starts to release at point 368. However, the energization of release magnet 56 retracted locking bars as 59 which resulted in the release of locked down keys 51 and 52.

A zero setting operation similar to that heretofore described may now be initiated by pressing the zero setting key 81 to energize zero setting relay 108. As stated, a zero setting operation similar to that heretofore described, will be initiated upon energization of relay 108 except that in this instance wheel 105 as well as wheels 104 and 103 will move back to their zero positions.

Multiplication

As an example the multiplying of 68 times 13 is described herein but it is to be understood that this is merely exemplary of multiplications that may be performed in the machine.

*Preparation for multiplication.*—A timing chart for the multiplication herein described is shown in Figs. 9 to 12 inclusive.

Figure 10:
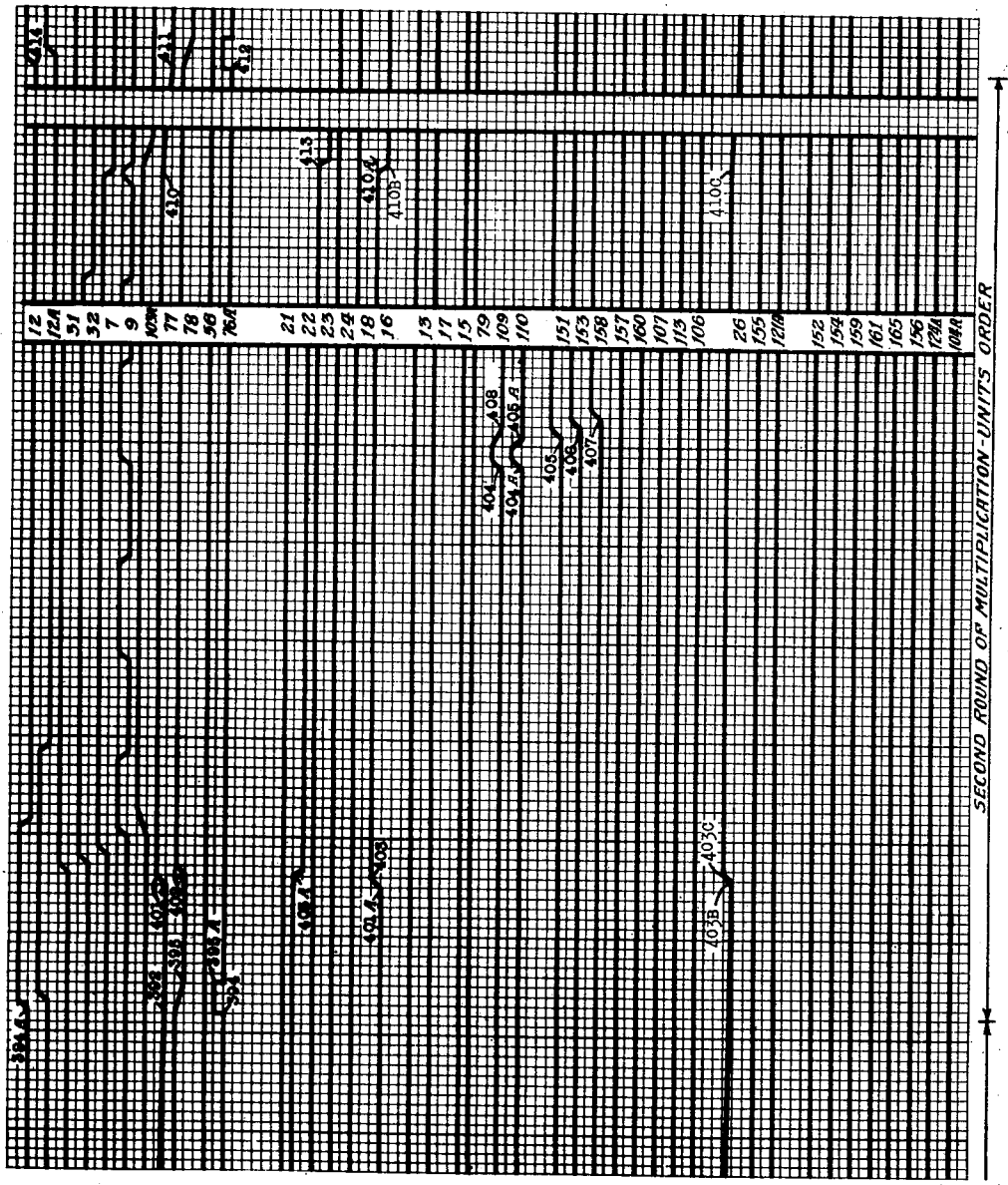
Figure 11:
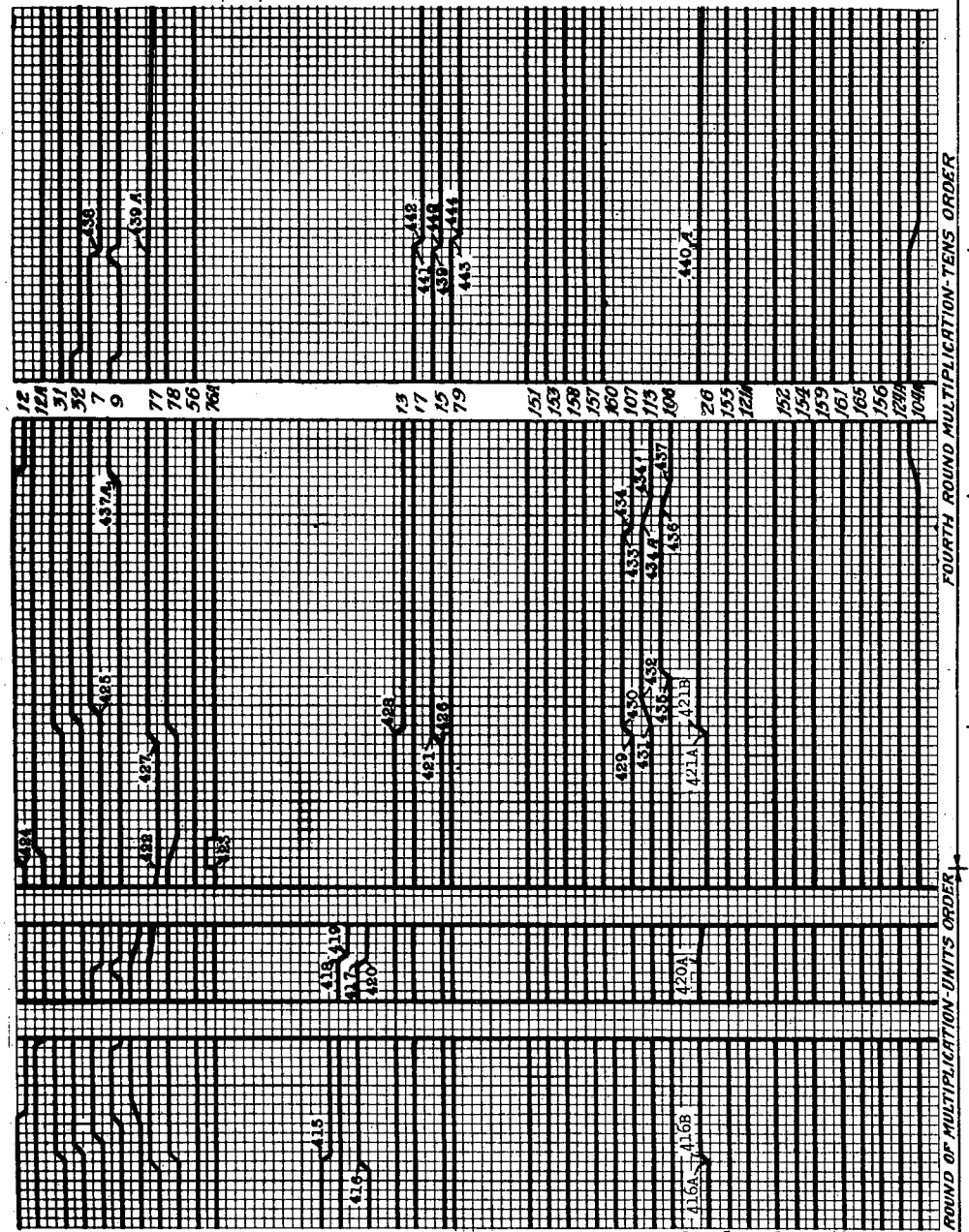
Figure 12:
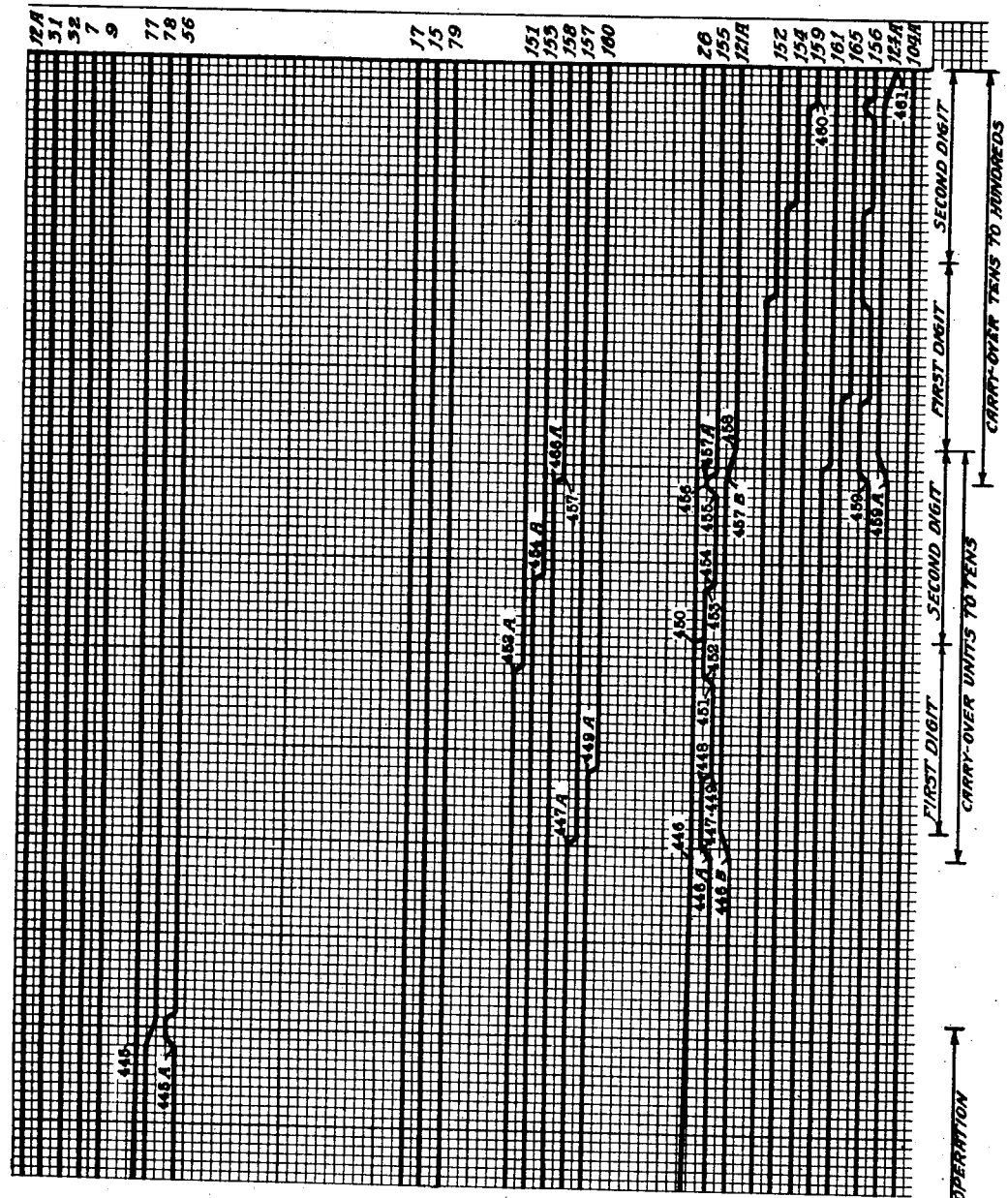

As the first step in the multiplication of 68 times 13 multiplicand keys 57 and 58, the 6 and 8 keys in the tens and units orders, respectively, are pressed and locked down at point 370 in Fig. 10 and thereby circuits are prepared but not closed to the counting or multiplicand relays 11 and 12 for 6 and 8 in the tens and units orders, respectively, of the counting or multiplicand relays.

Keys 83 and 84 for 1 and 3, respectively, in the tens and units orders of the multiplier keys are momentarily pressed at point 371, Fig. 10. Pressing of key 83 closes contact 83A grounding conductor 83B (Fig. 2), 83B (Fig. 3), which initiates energization of relay 13 through its right hand winding. Energization of relay 13 at point 372 closes the left hand contact thereof whereby relay 13 is locked up under control of contact 15A through conductor 86B and normally closed contact 86A.

Energization of relay 13 at point 372 also closes the right hand contact thereof whereupon its mate, relay 17, is energized through the left hand winding thereof and when this relay is energized at point 373 it closes contact 17B thereof to prepare, but not close, a circuit to control relay 15.

Energization of relay 17 at point 373 also closes the right hand contact thereof whereby a circuit is prepared through the right hand winding to contact 15B, which contact is grounded through conductor 86B and contact 86A.

Pressing of key 84 closes contact 84A grounding conductor 84B whereby relay 14 is energized at point 372A through its right hand winding. Energization of relay 14 at point 372A closes the left hand contact thereof whereby a stick or holding circuit under control of contact 16A is closed through conductor 86B and contact 86A.

Energization of relay 14 at point 372A also closes the right hand contact thereof whereby its mate, relay 21, is energized and upon energization of this relay at point 373A a circuit is prepared to contact 16B through the right hand contact of this relay. Energization of relay 21 also closes the left hand contact thereof whereby relay 22 is energized at point 374 through its right hand winding. This closes a stick or holding circuit under control of contact 16A through the left hand winding of relay 22 and the mate of 22, relay 23, is energized at point 375 as was relay 21 by the energization of relay 14. In like manner energization of relays 24 and 18 is effected at points 376 and 377, respectively.

Energization of relay 18 at point 377 closes contacts 18B and opens contact 18C whereby circuit to contact 17B is opened and a circuit is prepared, but not closed, to relay 16.

Inasmuch as both the relays 13 and 14 immediately lock up through stick or holding circuits it is only necessary to momentarily depress the multiplier keys as 83 and 84.

*Error correction.*—If one or more of the multiplier keys is incorrectly depressed so that a wrong multiplier is set up, error key 86 is pressed whereby contact 86A is opened. This frees contacts at 15A and 16A from ground whereupon relays as 13 and 14 are freed from ground which thereupon deenergize and release their mates and all relays of lower numerical value in the chain. When all such relays have been released key 86 is released whereupon contact 86A recloses and then the correct multiplier keys may be momentarily depressed to lock up the correct multiplier.

*First step in multiplication.*—Assuming that multiplier relays 13 and 14 and their associated relays have been locked up in the manner previously described and that multiplicand keys have been pressed and locked down whereby their associated contacts have been closed and circuits have been prepared to counting relays as 11 and 12, starting key 76 is momentarily depressed at point 378 whereby conductor 76A is momentarily grounded. This grounds the contacts associated with the locked down multiplicand keys 57 and 58 whereupon multiplicand relays 11 and 12 are grounded and then they energize. When energized at point 379 (the counting relays for the units order only being shown in Figs. 9 to 12, inclusive) these relays, in the manner previously described, energize their mates and all multiplicand relays in the same chain of lower numerical value. In the timing chart only the relays for the eight and one digits are shown but these are shown in their relative timed relation, the intervening relays locking up one after the other in the manner previously explained.

Figure 9:
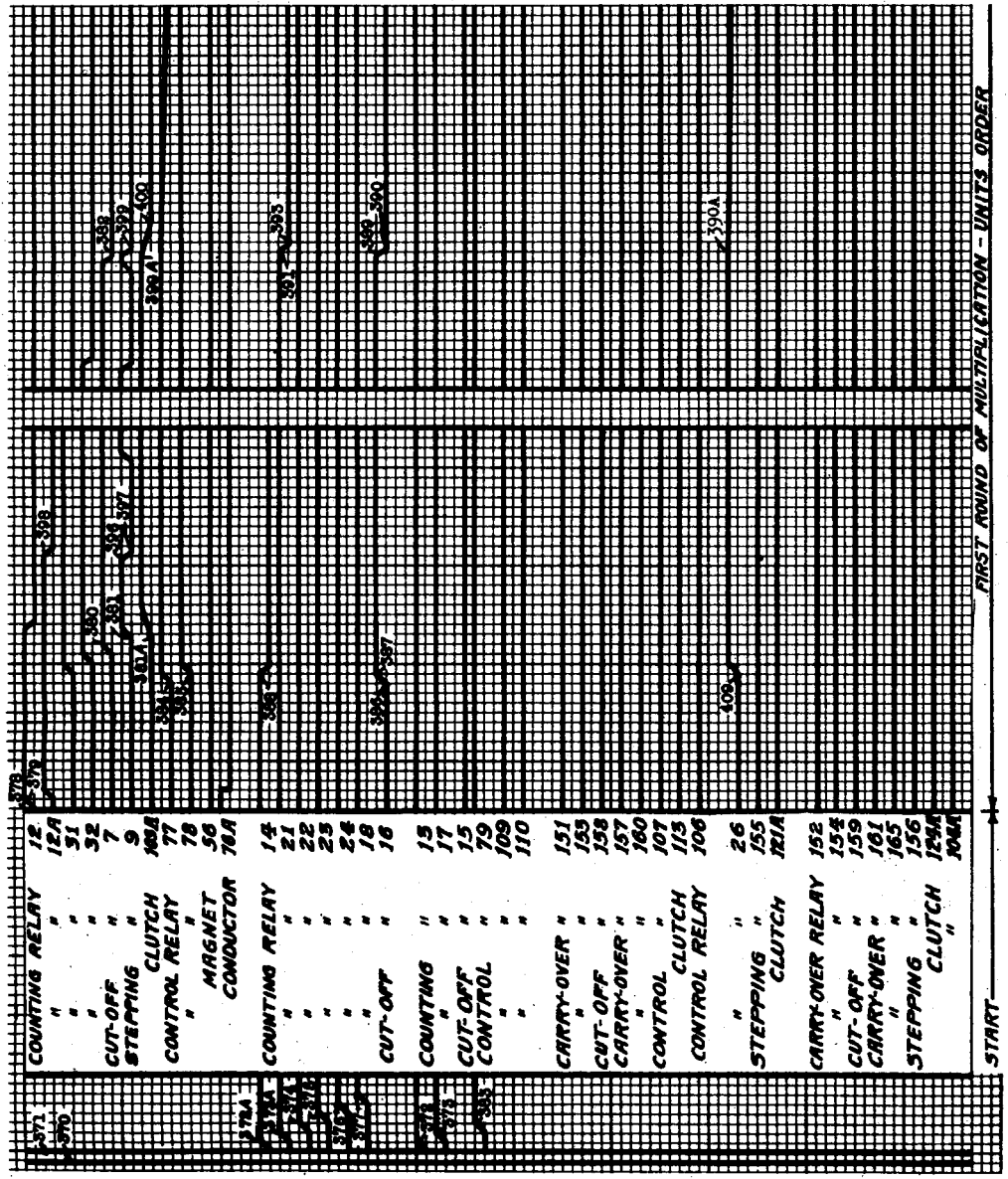

The cut-off relays 8 and 7 will be energized in the manner previously described upon energization of the last of the tens and units orders multiplicand or counting relays whereby contacts 8B and 7B are closed to engage clutches 104A and 103A, setting the number wheel units including the number wheels 104 and 103 in motion with shaft 132. The energization of relay 7 is shown in Fig. 9 at point 380 and the resulting energization of stepping relay 9 is shown at point 381 and the also resulting energization clutch 103A is shown at point 381A. The wheel units 104 and 103 continue movement under control of counting relays, in the manner previously described, until wheel 104 registers 6 and wheel 103 registers 8. After wheel 103 has taken motion, the contact 103E associated with the shunting wheel 103D is closed thereby shunting out relay 9 which starts to deenergize at point 396, and upon completion of such deenergization at point 397, contact 9B opens whereby relay 12A starts to release at point 398. While the shunting wheel 103D continues rotation with the number wheel 103 the contact 103E is alternately opened and closed to successively energize and deenergize relay 9 which thus successively unlocks the chain of counting relays associated with the units order. Finally at point 398, Fig. 9, during the entry of the digit "8" the shunting contact 103E is opened whereupon relay 9 is reenergized to open contact 9A thus deenergizing cut-off relay 7 at point 382 and allowing contact 7B to open thereby opening the series circuit which had been energizing units wheel clutch 103A and which had been providing ground for the energization of stepping relay 9 for its energization at such times when the shunting contact 103E was open. Therefore, upon the opening of contact of 7B, stepping relay 9 starts to release at point 399 and clutch 103A starts to release at point 399A. At point 400 clutch 103A is completely released coincidentally with wheel 103 registering the digit "8". During the entry of the digit "6" on the tens number wheel 104, cut-off relay 8 releases as previously described. Subsequently during the entry of 8 on the number wheel 103, cut-off relay 7 releases at point 382. Release of cut-off relay 8 opens contact 8C and release of cut-off relay 7 opens contact 7C.

The energization of relay 17 at point 373 upon energization of the multiplier relays, as above described, closed contact 17X whereby conductor 79C was grounded and relay 79 then energized at point 383 closing contact 79A and opening contact 79B to prevent grounding of release magnet 56 until the last round of multiplication. Contact 79A is closed upon energization of relay 79 at point 383 and connects contact 77B with grounding conductor 76A.

In example of multiplication described herein the multiplier keys for the digits 1 and 3, in the tens and units orders, respectively, are pressed energizing in the tens order but one pair of relays (13 and 17) and three pairs in the units order beginning with relays 14 and 21. In this and all other like operations it is the upper relay of the No. 1 relay pair of the order in which the lowest digital value is entered that energizes first and which is effective, by means of contacts as 17X, in energizing relay 79. In the present instance relay 18 energizes and closes contact 18X after the energization of relay 17. This, however, is without effect in bringing about initial energization of relay 79 as this will have already been effected by the closing of contact 17X.

It will thus be seen that whenever any of the multiplier relays are energized relay 79 is energized and contact 79B is opened and contact 79A is closed.

Furthermore, contacts 8C and 7C closed, before contacts 8B and 7B, upon energization of the cut-off relays 8 and 7 when their associated multiplicand relays energized with the effect of grounding conductor 77C whereby relay 77 was initially energized at point 384 upon the closing of contact 8C and the energization of relay 77 initiated energization of relay 78 at point 385. Closing of contact 8C also grounded conductors 19 and 18F whereby ground was applied to relay 16 at point 386 which thereupon started to energize and when relay 16 was energized at point 387 contact 16B was closed before contact 16A opened. Opening of contact 16A at point 387 initiated release of relay 14 at point 388 but relay 21 was held energized through contact 16B.

When, however, contacts 8C and 7C both have opened as above described and specifically when contact 7C opened upon release of relay 7 at point 382, the conductors 77C, 19 and 18F were freed from ground. This initiates deenergization of relay 16 at point 389, the release of relay 16 at point 390 making contact 16A before breaking contact 16B and relay 22 is held energized but relay 21 starts deenergization at point 391. Inasmuch as relay 77 is a slow-to-release relay it releases at point 392 subsequent to the release of relay 16 at point 390. Thus by the time contact 77B is closed at point 392 relay 21 will be released at point 393 and relay 22 will be held energized through contact 16A. Closing of contact 77B upon release of relay 77 grounds conductor 76A at point 394 whereupon counting relays 11 and 12 simultaneously start to energize, the start of energization of relay 12 being indicated at point 394A and thereupon the mates of relays 11 and 12 and relays of lower digital value in the respective groups are reenergized, one after the other. Subsequent to the energization of relays 11 and 12 slow-to-release relay 78 releases at point 395, opening contact 78A whereby ground is removed from grounding conductor 76A at point 395A.

When the counting relays finish their energization and cut-off relays 8 and 7 reenergize, contacts 8C and 7C are closed and when contact 8C closes conductors 77C, 19 and 18F are again grounded. This reenergizes relay 77 at a point 401 and then at point 402 relay 78 energizes and relay 16 starts to energize at point 401A. Energization of relay 16 at point 403 starts to free relay 22 at point 403A but holds relay 23 energized.

*Entry of carry-over in multiplication.*—Inasmuch as the counting relays are now again in operation, the second entry of 68 onto the wheels 104 and 103 will be effected and when this second entry of 68 is completed the wheels 104 and 103 will respectively register 2 and 6. In passing from 8 to 6 in this operation the number wheel 103 passes from 9 to 0 whereupon the lobe 103J on wheel 103F closes contact 103G whereby relays 109 and 110 are energized at points 404 and 404A, respectively, and relays 151 and 153 are energized and locked up, as well as cut-off relay 158, relay 151 starting to energize at point 405 upon release of relay 110 at point 405A and relay 153 starting to energize at point 406 upon energization of relay 151. Upon the energization of relay 153, relay 158 starts to energize at point 407. Relay 109 releases at point 408.

In passing from 6 to 2 number wheel 104 passes from 9 to 0 whereby the lobe on wheel 104F closes contact 104G and relays 133 and 134 are energized with the result that relays 152 and 154 are energized and locked up. The energization points of relays 152 and 154 are not shown in the timing chart since this occurs after the energization of relays 151 to 153 and before the final entry operation in the units order, which is next shown on the chart. Hence a carry from the units order to the tens order and another carry from the tens order to the hundreds order are entered or accumulated in the carry over relays.

Each time relays as 15 and 16 energize contacts as 15D and 16D close whereby ground is applied to slow-to-release relay 26 which thereupon energizes and opens contact 26A. Then when relay 16 first energized at point 387 contact 16 D closed whereupon relay 26 started to energize at point 409. Release of cut-off relays 8 and 7 near the end of the first entry of 68 closed contacts 8D and 7D while contact 37 was already closed. This, however, does not have the effect of grounding conductor 25 and initiating a carry-over operation at this time inasmuch as contact 26A is open. Contact 26A is open due to the timing of relay 26, which is timed to continue energized between successive energizations of the multiplicand relays and to release only after completion of the last round of multiplication. Thus referring to Figs. 9 and 10 of the timing chart, slow-to-release relay 26 begins deenergization at point 390A upon deenergization of relay 16 at point 390 near the end of the first entry of 68, but later upon the reenergization of relay 16 at point 403 near the beginning of the second entry of 68 the deenergizing relay 26 is caught and repotentialized at point 403B and thus caused to again become fully energized at point 403C thereby preventing closing of contact 26A.

Near the end of the entry of 2 and 6 on the wheels 104 and 103, which is the end of the second round of multiplication, cut-off relays 8 and 7 released and when 7C opened conductors 77C, 19 and 18F were freed from ground whereupon at point 410 relay 77 started to release and this relay releases at point 411 with the above described effect of re-grounding of conductor 76A at point 412 and also opening of contact 7C has the effect of starting deenergization of relay 16 at point 410A and causing deenergization thereof at point 410B whereby relay 23 started to deenergize at point 413 and whereby slow-to-release relay 26 started deenergization at point 410C, but relay 24 remained energized.

*Last round of multiplication under control of units order multiplier relays.*—Counting relays 11 and 12 reenergize as a result of the re-grounding of grounding conductor 76A and thus effect reenergization of cut-off relays 8 and 7, relay 12 starting to energize at point 414. Relay 24 is deenergized at point 415 by reason of reenergization of relay 16 at point 416 upon the closing of contact 8C. Reenergized relay 16 picks up relay 26 at point 416A before it has completely deenergized and thus causes its complete energization at point 416B. Relay 18 remains energized under control of contact 16B.

The number wheels 104 and 103 are now in operation and subsequent to the release of the cut-off relays 8 and 7 in this operation the wheels will register 8 and 4 respectively. In this operation number wheel 103 in passing from 6 to 4 passed from 9 to 0 whereupon the lobe 103J on wheel 103F closed contact 103G with the effect of energizing relays 109 and 110 whereby relays 157 and 160 were locked up and a second carry was accumulated in the carry-over relays, this not being shown on the timing chart since this operation occurs intermediate the illustrated operations.

Upon deenergization of relays 8 and 7 contacts 8C and 7C open and when contact 7C opens conductors 77C, 19 and 18F are freed from ground. This depotentializes relay 16 at point 417 whereby contact 16B opens at point 420 and relay 18 is depotentialized at point 418. The subsequent release of relay 18 at point 419 opens contact 18B and closes contact 18C whereby conductor 18F is disconnected from relay 16 and is connected through contact 18C with conductor 17F which through closed contact 17B is connected with relay 15 to prepare it for energization upon the next closing of contacts as 8C or 7C, contact 8C in the present instance having this effect. The deenergization of relay 16 at point 420 started deenergization of slow-to-release relay 26 at point 420A.

*Order shift in multiplication.*—Upon release of relay 18 at point 419 contact 18D closed grounding conductor 18E and contact 111 and through wiper 112 and conductor 112A relay 107 is thereby grounded. Battery is subsequently supplied to relay 107 through conductor 107D from contact 15C upon the energization of relay 15 at point 421 at the start of the next operation which is under control of locked up relays 13 and 17 in the tens order of multiplier relays.

Subsequent to the release of relay 16 at point 420 relay 77 released at point 422 closing contact 77B to ground conductor 76A at point 423 and effecting energization of counting relays 11 and 12 as well as cut-off relays 7 and 8, relay 12 energizing at point 424 and relay 7 energizing at point 425. Energization of cut-off relays 7 and 8 closes contacts 7C and 8C and when contact 8C closes conductors 77C, 19, 18F and 17F are grounded with the result that relay 15 starts to energize at point 426 and relay 17 also starts to energize at this same time as indicated at point 427. Contacts as 7C always close before contacts as 7B and therefore relays as 15 are energized before the stepping relays associated with the counting or multiplicand relays are energized. The energization of relay 15 at point 421 which results from the aforesaid closing of contact 8C opens contact 15A at point 421 after contact 15B has been closed. Hence relay 13 starts to release at point 428 but relay 17 is held energized. Energized relay 15 picks up relay 26 at point 421A prior to complete deenergization of relay 26 and thus causes its complete energization at point 421B.

The energization of relay 15 at point 421 also closes contact 15C whereupon relay 107 starts to energize at point 429 and relay 107 is energized at point 430 before the energization of stepping relays as 10 by the closing of contacts as 8B. Energization of relay 107 at point 430 opens contact 107B whereby conductor 106B is disconnected from battery and this prevents energization of stepping relays as 10 and parts in circuit therewith upon the immediately following closing of contacts as 8B.

Energization of relay 107 at point 430 closes contact 107A whereby clutch 113 is grounded at point 431 and engaged at point 432 whereupon shaft 114 is set in motion and this moves wiper 112 from engagement with grounded contact 111 into engagement with contact 111A. Contact 111A however is not grounded since contact 17D is open because relay 17 is energized. Thus when wiper 112 disengages contact 111 relay 107 is freed from ground and it thereupon starts to deenergize at point 433 and it then releases and recloses contact 107B at point 434 and also clutch 113 starts to release at point 434A and when this clutch releases at point 434' shaft 114 stops rotating.

The opening of contact 107B at point 430 and the resulting disconnection of conductor 106B from battery prevents energization of stepping relays 10 and 9 and the clutches as 104A and 103A when contacts 8B and 7B of cut-off relays 8 and 7 close during an operation entailing an order shift operation. These relays and clutches, however, are not reenergized immediately by the reclosing of contact 107B upon release of relay 107 at point 434 because slow-to-release relay 106 is energized whereby contact 106A is opened, this relay 106 energizing and opening contact 106A upon movement of shaft 114 from one position to the next in the order shift operation as will now be described.

The relay 106 is energized through contact 114A which includes a rider engaged with the toothed disc 114C on shaft 114. As soon as shaft 114 starts to move in an order shift operation the rider on contact 114A rides up on a tooth on the disc 114C and thereby closes contact 114A. In the illustrated operation contact 114A closes and applies ground to relay 106 at point 435 and thereupon relay 106 energizes. Before movement of shaft 114 ceases the rider on contact 114A moves off the tooth on disc 114C and contact 114A therefore opens and relay 106 starts to deenergize at point 436. Relay 106 being a slow-to-release relay however does not immediately release and in fact does not until the order switching operation is completed and in the present instance it releases at point 437. Hence stepping relays 10 and 9 and clutches as 104A and 103A are not reenergized for the next operation until slow-to-release relay 106 releases at point 437 and at this time the order shift operation is completed.

Upon movement of the shaft 114 whereby wiper 112 moves from engagement with contact 111 into engagement with contact 111A the units order shifting wiper 115 advances one step from engagement with the contact 101 into engagement with contact 118. The tens order shifting wiper 116 also moves from engagement with contact 102 into engagement with contact 119 and the hundreds order shifting wiper 117 advances in like manner.

In the present example during operation of the order shift mechanism preparatory to multiplication in the tens order in the manner just described, wiper fingers as 115 were advanced but a single position or order for when the wiper finger 112 moved beyond contact 111 the energizing circuit for order shift clutch 113 was caused to be broken. This circuit is traceable from ground at contact 18D, conductor 18E, contact 111, wiper finger 112, conductor 112A, relay 107, conductor 107D and to closed contact 15C of energized relay 15 and battery. Hence when this circuit was broken at contact 111 the relay 107 deenergized opening contact 107A and deenergizing clutch 113.

Now if the multiplier factor had been 103 instead of 13, the multiplier counting relays would have been set up differently, that is, relays X1 and Y1 in the hundreds order would have been energized and relays 13 and 17 in the tens order would have been left unenergized. Under these conditions as an incident to the order or column shift, when the multiplicand relays are energized the energization of cut-off relay 8 would extend ground through contact 8C, conductor 19, conductor 18F, contact 18C of deenergized relay 18, conductor 17F, contact 17C of unenergized relay 17, conductor Y1F and contact Y1B to stepping relay 36 energizing the same. Both contacts 18D and 17D being closed would respectively extend ground to contacts 111 and 111A, Fig. 4. Therefore upon the energization of stepping relay 36 and the closing of contact 36C, circuit would first be completed from ground at contact 18D through conductor 18E, contact 111, wiper finger 112, conductor 112A; relay 107, conductor 107D and said closed contact 36C to battery causing energization of relay 107, the closing of contact 107A and energization of the order shift clutch 113. During such an operation the energization circuit for relay 107 would not be broken when wiper finger moved beyond contact 111 for the circuit would be maintained through contact 111A which would be grounded from contact 17D. Contact 107A would therefore remain closed energizing order shift clutch 113 until the column shift fingers as 115 had advanced two columnar positions or until the finger 112 had moved into contact with the third of its cooperative contacts and out of engagement with grounded contact 111A.

The rider of contact 114A would be closed a second time during the movement of the wipers as 115 from their second to their third cooperative contacts and after the second closing of contact 114A the rider thereof would ride down on a tooth of the disc 114C into position permitting said contact to open and start deenergization of slow relay 106 in the manner above described so that upon the closing of contact 106A the circuit will be established from battery at contact 107B to permit energization of the stepping relays 10 and 9 and the number wheel clutches then respectively in series therewith. The operation would then proceed as before when the order shift was over but a single position.

The example just given of an order shift operation for handling a multiplier as 103, or, a multiplier having a zero digit in an intermediate order is illustrative of order shift operations in which there may be in the multiplier any number of intermediate orders in which the digit is zero. In each of such orders wherein the digit is zero there would be set up no paired number one multipler relays as 13 and 17 and consequently for such orders the contacts as 17D would be closed respectively impressing ground on their associated contacts as 111A so that ground for wiper finger 112 would be available as it passed successively over the contacts until it ultimately reached a contact as 111A associated with a multiplier order having a significant digit whereby the relay as 17 of such order would be energized to open its contact as 17D thereby removing ground from such ultimately reached contact. Circuit would then be broken at this ultimately reached contact whereupon the relay 107 would deenergize and open contact 107A to cause deenergization of the order shift clutch 113. During rotation of the shaft 114 the teeth on disc 114C would close contact 114A during the shift to each columnar position and would permit contact 114A to open shortly prior to the attainment of each columnar position and consequently just prior to the attainment of the ultimate columnar position the contact 114A would open permitting complete deenergization of relay 106 and the closing of contact 106A whereby after said ultimate columnar position is reached, the battery at contact 107B would be available to cause energization of stepping relays 109 and 110 and the number wheel clutches then connected in series therewith by the wiper fingers as 115.

If the multiplier factor had been a number containing a zero in the tens order such as the number 20, then a column shift operation would have taken place prior to any multiplying action. Assuming the multiplier to have been 20 instead of 13, the operator would have pressed only one. key (Fig. 2) of the multiplier keys, namely, the number 2 key in the tens order thereby causing energization of multiplier relays 13A, 13B, 13 and 17 in Fig. 13. Then subsequently upon initiating operation of the machine by pressing the starting key 76 the multiplicand relays would energize for the first time and cause energization of cut-off relay 8 which would place ground on conductors 19 and 18F and since relay 18 would remain unenergized its contact 18C would be closed extending such ground from conductor 18F through conductor 17F and contact 17B to stepping relay 15 which would then energize closing contact 15C which is connected with battery as a source of energization for relay 107 in Fig. 4. Unenergized relay 18 would also provide closed contact 18D which is grounded and through contact 111 and order shift wiper finger 112 (Fig. 4) would extend ground potential to the other side of said relay 107 to cause energization thereof for closing contact 107A and energizing clutch 113 for effecting the order or column shift. Since multiplier counting relay 17 would be energized contact 17D would be open and order shift contact 111A would be ungrounded whereby the energizing circuit for relay 107 would be broken after wiper finger 112 was advanced out of engagement with contact 111. This deenergization of relay 107, as before, would open contact 107A causing deenergization of clutch 113 in time to stop rotation of the shaft 114 while the finger 112 rests on contact 111A and when all of the wiper fingers as 115 would have been advanced one columnar position.

Had the multiplier factor been 200, multiplier relays X2, Y2, X1 and Y1 would have been the only multiplier counting relays energized. Contacts 17D and 18D would have been closed impressing ground upon contacts 111 and 111A of the order shifting mechanism, and contacts 18C, 17C and Y1B would have been closed so that upon the first energization of the multiplicand counting relays and the closing of cut-off relay contacts as 8C relay 36 would have been energized, closing contact 36C and thus providing battery for one side of the series circuit through relay 107 while the contacts 111 and 111A grounded respectively from contacts 18D and 17D would complete said circuit upon the other side of relay 107 so that contact 107A would close and remain closed for holding the order shift clutch 113 energized sufficiently long to cause the order shift contact fingers as 115 to be advanced two columnar positions before stopping. Meanwhile, as before, the toothed disc 114C would actuate contact 114A for causing energization of slow-to-release relay 106 and the consequent opening of contact 106A thereby withholding battery, at contact 107B, from the series circuit including the stepping relays as 9 and 10 and number wheel clutches until movement of the order shift fingers as 115 has ceased after carrying them to their respective number three order shift contacts. In this manner the action of the multiplicand counting relays would be delayed until the circuits through their stepping relays as 9 and 10 would be connected with the clutches of the proper number wheels after the order shift operation.

An explanation will now be given of the multiplying operations in the tens order pursuant to multiplying 68 by the digit 1 of the multiplier 13.

*Multiplication in tens order.*—As the result of the above described order shift operation and the resulting advance of wipers 115 and 116, stepping relay 9 is in circuit with clutch 104A and stepping relay 10 is in circuit with clutch 105A. Clutch 103A is out of circuit inasmuch as the units order number wheel is not to be operated because operation is now under control of the tens order multiplier relays. At the start of this next operation the wheels 105, 104 and 103 respectively register 0, 8 and 4.

When battery is supplied to conductor 106B by the closing of contact 106A at point 437 clutches 104A and 105A and stepping relays 9 and 10 start to energize, the relay 9 starting to energize at 437A and the clutch 104A starts to energize at point 437B. Thereafter under the control of the multiplicand relays, 6 and 8 are respectively added on the number wheels 105 and 104 and at the end of this operation the wheels 105, 104 and 103 register 6, 6, 4, respectively.

In this operation number wheel 104 passes from 8 to 6 and hence passes from 9 to 0 which results in the closing of contact 104G and the energization of relay 161 and its mate 165, this occurring intermediate the operation shown on the chart.

While the last digit 6 is being entered on the number wheel 105 cut-off relay 8 deenergizes and subsequently while the last digit 6 is being entered on the wheel 104 cut-off relay 7 deenergizes at point 438. Upon deenergization of cut-off relay 7 and the opening of contact 7C, conductors 77C, 19, 18F and 17F are freed from ground. This deenergizes relay 15 at point 439 which releases at point 440 and opens contact 15B whereupon relay 17 starts to deenergize at point 441. Deenergization of relay 17 at point 442 opens contact 17X whereupon relay 79 starts to deenergize at point 443 and when released at point 444 contact 79A opens and contact 79B closes. Hence when slow-to-release relay 77 subsequently releases at point 445 (said relay 77 starting to release at point 439A upon opening of contact 7C when relay 7 releases at point 438) and contact 77B closes, circuit is closed through contacts 78A and 79B and conductor 80F to release magnet 56 whereupon this magnet started to energize at point 445A and energization of magnet 56 results in locked down keys 57 and 58 being released.

At this time all counting relays and their cut-off relays and all multiplier relays and their control relays are released.

*Carry-over operation multiplication.*—Since the cut-off relays 7 and 8 are released contacts 7D and 8D are closed. Moreover the control relays 15 and 16 are released and circuit to slow-to-release relay 26 is opened. Circuit to slow-to-release relay 26 is opened in the present instance at point 440A when relay 15 released at point 440. Slow-to-release relay 26 prevents grounding of conductor 25 intermediate rounds of multiplication and during order shift operations by maintaining contact 26A open. Hence the release time of this relay is sufficiently prolonged to prevent opening of contact 26A to enable nine pairs of multiplicand relays to become energized as well as the cut-off relay as 7 associated therewith and a control relay as 16 and also to allow for its own energizing time. When, however, relay 26 does release at point 446 contact 26A closes and conductor 25 is grounded through closed contacts 37, 8D, 7D and 26A.

In the present instance cut-off relay 158 is energized since carry-over relays in the lower group are energized wherefore contact 158B is closed and contact 158C is open. Therefore conductor 25 is connected through contact 158B with stepping relay 155 and clutch 121A. Thus grounding of conductor 25 at point 446 energizes stepping relay 155 at point 446A and clutch 121A at point 446B whereupon wheel 104 takes motion.

The energization of relay 155 at point 447 starts to release relay 157 at point 447A. Shortly after wheel 104, and therefore shunting wheel 121, take motion, contact 121E shunts out stepping relay 155 at point 448 and this relay releases at point 449 whereupon relay 160 starts to release at point 449A. Shunting wheel 121 continues to move and just prior to the entry of the first carry on the wheel 104, that is to say, immediately before this wheel registers 7 at point 450, shunting contact 121E opens to start to energize relay 155 at point 451 and this relay energizes at point 452 and thereby starts to release relay 151 at point 452A.

Wheels 104 and 121 continue movement and shortly after the beginning of the entry of the second carry, that is, shortly after the beginning of the registration of 7 on the wheel 104, shunting contact 121E closes and starts to deenergize relay 155 at point 453 and this relay deenergizes at point 454 to start to release relay 153 at point 454A and shortly before the registration of 8 is completed contact 121E opens to start to energize relay 155 at point 455 and this relay energizes at point 456 to start to release cut-off relay 158 at point 456A. Relay 158 releases at point 457 whereupon contact 158B opens and stepping relay 155, at point 457A, and clutch 121A, at point 457B, are freed from ground and the clutch releases at point 458 and the wheel 104 registers 8.

Immediately after contact 158B opened contact 158C closed and since cut-off relay 159 is energized, contact 159B is closed wherefore conductor 25 grounds stepping relay 156 at point 459 and clutch 124A at point 459A whereupon number wheel 105 and shunting wheel 124 take motion. This, in the manner above described in connection with the relays 157, 160, 151, 153 and 158, effects successive release of relays 161, 165, 152, 154 and 159 and upon the release of relay 159 at point 460 clutch 124A starts to release and when released at point 461 the wheel 105 will register 8.

Wheels 105, 104 and 103 now register 884, the product of 68 times 13.

*Zero-setting operation.*—Since the multiplying computation has been completed it is desirable to reset the number wheels to zero and this is effected by momentarily closing zero-setting key 81 whereupon all of the number wheels take motion under control of their zero-setting contacts and return to zero in the manner previously described.

Inasmuch as the switch 130 has been shifted from its normal units order position contact 128 is closed. Hence upon energization of the relay 108 by pressing of the key 81 ground is applied through closed contact 108G, conductor 128A, closed contact 128 to the clutch 113 whereupon the shaft 114 is set in motion and this shaft continues to rotate until the rider of contact 128 enters the notch in disc 114B fast on the shaft 114 whereupon contact 128 opens and clutch 113 is released. Since the notch in the disc 114B is at the normal units order position of switch 130 it will now have been returned to its normal units order position and since the number wheels 105, 104 and 103 will be in their zero positions the machine is ready for its next operation.

*Subtraction.*—The minuend is entered in the amount manifesting device in the same manner as that in which 34 is entered therein, which has been described heretofore. The subtrahend is then set up on the keys of Fig. 1 and the direction of rotation of shafts 132 and 127 is reversed. This can be done conveniently by reversing the motor 129. The subtrahend is then entered in the amount manifesting device under control of the counting relays, as described above, and since, in this operation, the amount manifesting device moves in a direction opposite to that in which it moved when the minuend was entered therein and the device therefore, after entry of the subtrahend, registers the difference. Any carry-over required is accumulated in the manner above described and is entered in the manner above described prior to the time the shafts 132 and 127 are again rotated in their normal direction of rotation.

*Summary*

In multiplying and adding operations a carry from one order of digits into the next higher order is necessary each time an amount manifesting member, for a particular order of digits, in an amount manifesting device passes from 9 to 0 and likewise, in a subtracting operation, when such a member passes from 0 to 9. The present invention includes means which are actuated each time such movement of an amount manifesting member occurs and in the illustrated form of the invention this consists of contacts, as 103G, which are engaged by means as wheel 103F and lobe 103J thereon, associated with the member, these contacts closing an electrical circuit.

I have found it to be advantageous to effect entry of a carry or carries from one order of digits in the next higher order of digits as the last step of a computation in which the carry or carries arise. Thus in an adding or subtracting computation the carry is effected after one number has been added to or subtracted from another, as the case may be, but in multiplying computations effected by the over and over addition method the carries are not effected until the multiplicand has been entered as many times as required by the multiplier and this entails accumulating and storing the carries. Thus I have provided means in association with each order of digits to accumulate the carries arising in that order of digits and I have so connected each of these means with the next higher order of digits that the accumulated carries may be entered in the next higher order at a predetermined time. The accumulation of the carries is effected under control of the means actuated by the means associated with the amount manifesting member of the amount manifesting device. In the illustrated form of the invention such accumulating and storing means are relays, as 151 and 153, under control of the circuit including the contacts that are closed each time a carry is to be made. Closing of the contacts effects energization and locking up of the relays sequentially in a number corresponding to the number of the carries required.

The entry of the carries in the order of digits next higher to that in which they arise is effected as the last step of the computation and this is under control means which effect starting of the entry of the carries when other steps are completed. Such means in the illustrated form of the invention are contacts, as 7D, 8D, 37 and 26A, in circuit with means as control relays, as 155, and entry effecting means such as clutches, as 121A.

The principle of operation of the machine as described differs from that of any other calculating machine of which I am informed. It sets aside, according to a selection, a chosen number of its own specific parts of potential activity, and puts them each in turn to an action while it drives a number wheel by a separate action, and so coordinates the two activities that the unitary advance of the number wheel must coincide with the successive actions of the chosen parts and cease with the exhaustion of their active number.

In the broader aspects of my invention I do not desire to be understood as limiting its embodiment to the forms herein illustrated, in view of the variety of mechanisms that may be adopted or modifications that may be made, within the scope of the appended claims, without departing from the scope of the invention.

I claim:

1. A calculating machine comprising a register, entry means therefor, means settable to represent a multiplicand value, entry control means cooperating with said entry means and controlled by the settable means for effecting entry of a value represented by the settable means into said register, said entry control means being set up and cleared in the course of each entry operation thereof, means for initiating a first entry effecting operation of said entry control means, differentially settable means settable to represent a multiplier, means under control of said entry control means for reducing the setting of said differentially settable means by one for each entry effecting operation of said entry control means, and means effective upon each reduction of the setting of said differentially settable means for effecting a further entry effecting operation of said entry control means under control of said settable means, said further entry effecting operations of the entry control means continuing until the setting of said differentially settable means is reduced to zero.

2. A machine according to claim 1 wherein said differentially settable means comprise members set in variable numbers, and wherein the reduction in the setting of said differentially settable means is accomplished by restoring set members.

3. A calculating machine comprising a register, entry means therefor, means settable to represent a multiplicand value, entry control means cooperating with said entry means and controlled by the settable means for effecting entry of a value represented by the settable means into said register, said entry control means being set up and cleared in the course of each entry operation thereof, means for initiating a first entry effecting operation of said entry control means, a series of members selectively set in variable numbers to represent a multiplier, means under control of said entry control means for restoring a set-up member of said series of set members upon each set-up and also upon each clearance of said entry control means to reduce the number of set members of said series by two for each entry effecting operation of said entry control means, and means effective upon each reduction by two of the setting of said settable members for causing a further entry effecting operation of said entry control means under control of said settable means, said further entry effecting operations of said entry control means continuing until the setting of said settable members is reduced to zero.

4. A calculating machine comprising a register, entry means therefor, means settable to represent a multiplicand value, entry control means cooperating with said entry means and controlled by the settable means for effecting entry of a value represented by the settable means into said register, said entry control means being set up and cleared in the course of each entry effecting operation thereof, means for initiating a first entry effecting operation of said entry control means, a series of relays selectively energizable in pairs to represent a multiplier, means under control of said entry control means for deenergizing a relay of an energized pair upon each set-up and also upon each clearance of said entry control means, and means effective upon deenergization of the second relay of a pair for causing a further entry effecting operation of said entry control means under control of said settable means, said further entry effecting operations of said entry means continuing until all of the energized relays are deenergized.

5. In a machine of the class described, multiplicand entry receiving means, multiplier entry set-up means, a differentially settable device under control of the multiplicand entry receiving means, a register, driving means therefor, means for transmitting the values entered in the multiplicand entry receiving means to said differentially settable device, means effective upon differential setting of said device for causing said driving means to operate said register according to the value set in said device, said device being cleared in the course of register operation, a second device differentially settable by said multiplier entry set-up means to represent a multiplier value, means under control of said first differentially settable device for reducing the value represented by said second device by one for each entry into said first device, and means controlled by the second differential device upon each reduction by one of the value set therein for reentering the multiplicand value in said first differentially settable device from the multiplicand entry receiving means, said reentry being repeated once for each unit of the multiplier, until the setting of said second differential device is zero.

6. In a calculating machine means settable to represent a multiplicand value, means for entering a multiplier value, a register, a series of members selectively settable to represent a multiplicand value under control of said settable means and to control entry of such value into the register, means for initiating the set-up of said members and the first entry of the value set up into the register, means for driving an element of said register, means controlled by the set-up members for enabling the drive means to drive said element, means controlled by the element for restoring said set-up members member by member in the course of an operation of said element by the driving means, said means controlled by the set-up members disabling said drive after release of all set-up members, a second series of members settable by said multiplier value entering means to represent a multiplier value, means for releasing a set member of the second series upon each set-up and each restoration of the first series of members, and means effective upon restoration of certain members of the second series to effect repeated set-up of the members of the first series, said repeated set-up being a number of times one less than the value which the members of the second series are set to represent.

7. A calculating machine comprising a register, means settable to represent a multiplicand value, a series of relays selectively energizable to represent a multiplicand value under control of the settable means and operable to control entry of such value into the register, means for driving an element of said register, means including an electric circuit controlled by the energized relays for enabling the driving means to drive said element, means controlled by the element for deenergizing said energized relays relay by relay in the course of an operation of said element by the driving means, said means controlled by the energized relays opening said circuit to disable the driving means after deenergization of all energized relays, means for effecting an initial energization of said relays and for initially closing said electric circuit, a series of members selectively set in variable numbers to represent a multiplier, means under control of said relays for restoring a set-up of said members upon each energization and also upon each complete deenergization of said relays to reduce by two the number of set members for each entry operation under control of the relays, and means effective upon each reduction by two of the setting of said settable members for causing a further energization of said relays under control of said settable means and a further closing of said circuit, said further energizations of said relays and closings of said circuit continuing until the setting of said settable members is reduced to zero.

8. A machine according to claim 7 wherein each member of said series of settable members is a relay, said relays being energized to be set up and deenergized to be restored.

9. A calculating machine comprising a register, means settable to represent a numerical value, a series of electrically energizable members selectively energizable under control of the settable means to represent a numerical value and to control entry of such value into the register, means for driving an element of said register, means controlled by the energized members for enabling the drive means to drive said element, means controlled by the element for deenergizing said energized members member by member in the course of an operation of said element by the driving means, said means controlled by the set-up members disabling said drive after release of all set-up members, and selectively conditioned control means for reenergizing said energizable members under control of said settable means after the disabling of said drive to effect a repeat entry.

CLYDE SMITH.